(12) United States Patent
Kitagawa

(10) Patent No.: US 9,169,808 B2
(45) Date of Patent: Oct. 27, 2015

(54) ENGINE EXHAUST GAS PURIFICATION DEVICE

(71) Applicant: YANMAR CO., LTD., Osaka (JP)

(72) Inventor: Tomoaki Kitagawa, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/368,873

(22) PCT Filed: Dec. 26, 2012

(86) PCT No.: PCT/JP2012/083715
§ 371 (c)(1),
(2) Date: Jun. 26, 2014

(87) PCT Pub. No.: WO2013/099979
PCT Pub. Date: Jul. 4, 2013

(65) Prior Publication Data
US 2014/0373821 A1    Dec. 25, 2014

(30) Foreign Application Priority Data
Dec. 27, 2011    (JP) .................................. 2011-286237

(51) Int. Cl.
*F02M 35/10*    (2006.01)
*F02M 25/06*    (2006.01)
*F01M 11/08*    (2006.01)
(Continued)

(52) U.S. Cl.
CPC ............... *F02M 25/06* (2013.01); *F01M 11/08* (2013.01); *F01M 13/00* (2013.01); *F02M 35/1038* (2013.01); *F01M 13/04* (2013.01); *F01N 3/035* (2013.01); *F01N 3/2885* (2013.01); *F01N 13/008* (2013.01); *F01N 13/0097* (2014.06); *F01N 13/1855* (2013.01)

(58) Field of Classification Search
CPC .......... F01M 13/00; F01M 2013/0077; F01M 2013/0038; F02M 35/10; F02M 35/10006; F02M 35/10078; F02M 35/10222; F02M 35/1038; F01N 13/008; F01N 13/1855
USPC ............................... 123/572, 573, 574, 41.86
See application file for complete search history.

(56) References Cited

U.S. PATENT DOCUMENTS 6,227,184 B1    5/2001    Katayama et al.
7,438,047 B2 *  10/2008   Kawasaki et al. ............. 123/337
(Continued)

FOREIGN PATENT DOCUMENTS

JP    61-275525    12/1986
JP    2005-273607  10/2005
JP    2010-480794  8/2010

*Primary Examiner* — Lindsay Low
*Assistant Examiner* — Grant Moubry
(74) *Attorney, Agent, or Firm* — Jordan and Hamburg LLP

(57) ABSTRACT

In detection of a temperature of fresh air which is supplied to an intake manifold of an engine, by a fresh air temperature sensor, the invention aims at preventing precision of an engine control from dropping due to difference in an attached position of the fresh air temperature sensor. The engine device has an intake pipe for supplying fresh air to the intake manifold, a breather chamber for separating lubricating oil, the breather chamber being arranged within a head cover covering an upper surface side of a cylinder head, and a blow-by gas return pipe. The intake pipe and the breather chamber are connected via the blow-by gas return pipe. The fresh air temperature sensor detecting a temperature of the fresh air introduced into the intake pipe is attached to the intake pipe.

3 Claims, 15 Drawing Sheets

(51) Int. Cl.
*F01M 13/00* (2006.01)
*F01M 13/04* (2006.01)
*F01N 3/28* (2006.01)
*F01N 13/00* (2010.01)
*F01N 13/18* (2010.01)
*F01N 3/035* (2006.01)

(56) References Cited

U.S. PATENT DOCUMENTS 8,118,013 B2 * 2/2012 Arvan ............................ 123/572
8,151,777 B2 * 4/2012 Miyaji .......................... 123/572
2010/0294231 A1 * 11/2010 Kusel ........................ 123/196 R

* cited by examiner

ENGINE EXHAUST GAS PURIFICATION DEVICE

TECHNICAL FIELD

The present invention relates to an engine device.

BACKGROUND OF THE INVENTION

It have been conventionally carried out to detect a temperature of fresh air which is supplied to an intake manifold of a diesel engine (hereinafter, refer simply to as an engine), by a fresh air temperature sensor. This kind of fresh air temperature sensor is arranged in an intake passage of the engine (refer, for example, to Patent Document 1).

CITATION LIST

Patent Document 1: Japanese Unexamined Patent Application Publication No. 2010-180794

SUMMARY OF THE INVENTION

However, in the prior art mentioned above, there is a case that an attachment position of the fresh air temperature sensor varies, for example, according to a working machine or according to a customer purchasing the engine, such as a case that the fresh air temperature sensor is provided in the middle of the intake passage which exists in the side of the working machine mounting the engine thereon. In this case, since the detected fresh air temperature varies according to difference of the attachment position of the fresh air temperature sensor, a precision of an engine control is deteriorated. In order to avoid the deterioration, for example, there can be listed up correction applied to a result of detection for every attachment position (layout) of the fresh air temperature sensor. However, there has been a problem that the engine control is complicated in this aspect.

A technical object of the present invention is to provide an exhaust gas purification device to which an improvement is applied by making a study of the actual condition as mentioned above.

According to a first aspect of the invention, there is provided an engine device including an intake pipe for supplying fresh air to an intake manifold, a breather chamber for separating lubricating oil, the breather chamber being arranged within a head cover covering an upper surface side of a cylinder head, and a blow-by gas return pipe, the engine device being structured such that the intake pipe and the breather chamber are connected via the blow-by gas return pipe, wherein a fresh air temperature sensor is attached to the intake pipe, the fresh air temperature sensor detecting a temperature of the fresh air introduced into the intake pipe.

According to a second aspect of the present invention, there is provided the engine device described in the first aspect, wherein the fresh air temperature sensor is positioned closer to an intake air upstream side than a connection portion to the blow-by gas return pipe in the intake pipe.

According to a third aspect of the present invention, there is provided the engine device described in the first aspect or the second aspect, wherein a sensor attachment base is integrally formed in an upper surface side of the intake pipe, the fresh air temperature sensor is detachably fastened to the sensor attachment base by bolts, and a connecting direction of a fresh air wiring connector provided in the fresh air temperature sensor is set so as to be along a longitudinal direction of the intake pipe.

According to the present invention, in the engine device including the intake pipe for supplying the fresh air to the intake manifold, the breather chamber for separating the lubricating oil, the breather chamber being arranged within the head cover covering the upper surface side of the cylinder head, and the blow-by gas return pipe, the engine device being structured such that the intake pipe and the breather chamber are connected via the blow-by gas return pipe, the fresh air temperature sensor is attached to the intake pipe, the fresh air temperature sensor detecting the temperature of the fresh air introduced into the intake pipe. Therefore, it is possible to constantly fix the attachment position (layout) of the fresh air temperature sensor in relation to the engine, and it is possible to constantly measure the fresh air temperature under the same condition (position) in relation to the engine. As a result, any correction applied to the result of detection is not required, and it is possible to maintain the precision of the engine control on the basis of a simple structure. It is possible to construct the structure of detecting the fresh air temperature at a low cost.

According to the invention of the second aspect, the fresh air temperature sensor is positioned closer to the intake air upstream side than the connection portion to the blow-by gas return pipe in the intake pipe. Therefore, it is possible to detect the fresh air temperature before mixing the blow-by gas into the fresh air. It is possible to prevent the fresh air temperature sensor from being polluted by the lubricating oil in the blow-by gas.

According to the invention of the third aspect, the sensor attachment base is integrally formed in the upper surface side of the intake pipe, the fresh air temperature sensor is detachably fastened to the sensor attachment base by the bolts, and the connecting direction of the fresh air wiring connector provided in the fresh air temperature sensor is set so as to be along the longitudinal direction of the intake pipe. Therefore, it is possible to make a harness connected to the fresh air wiring connector be along the intake pipe, and the existence of the harness does not get in the way.

DESCRIPTION OF THE PREFERRED EMBODIMENTS

Figure 1:
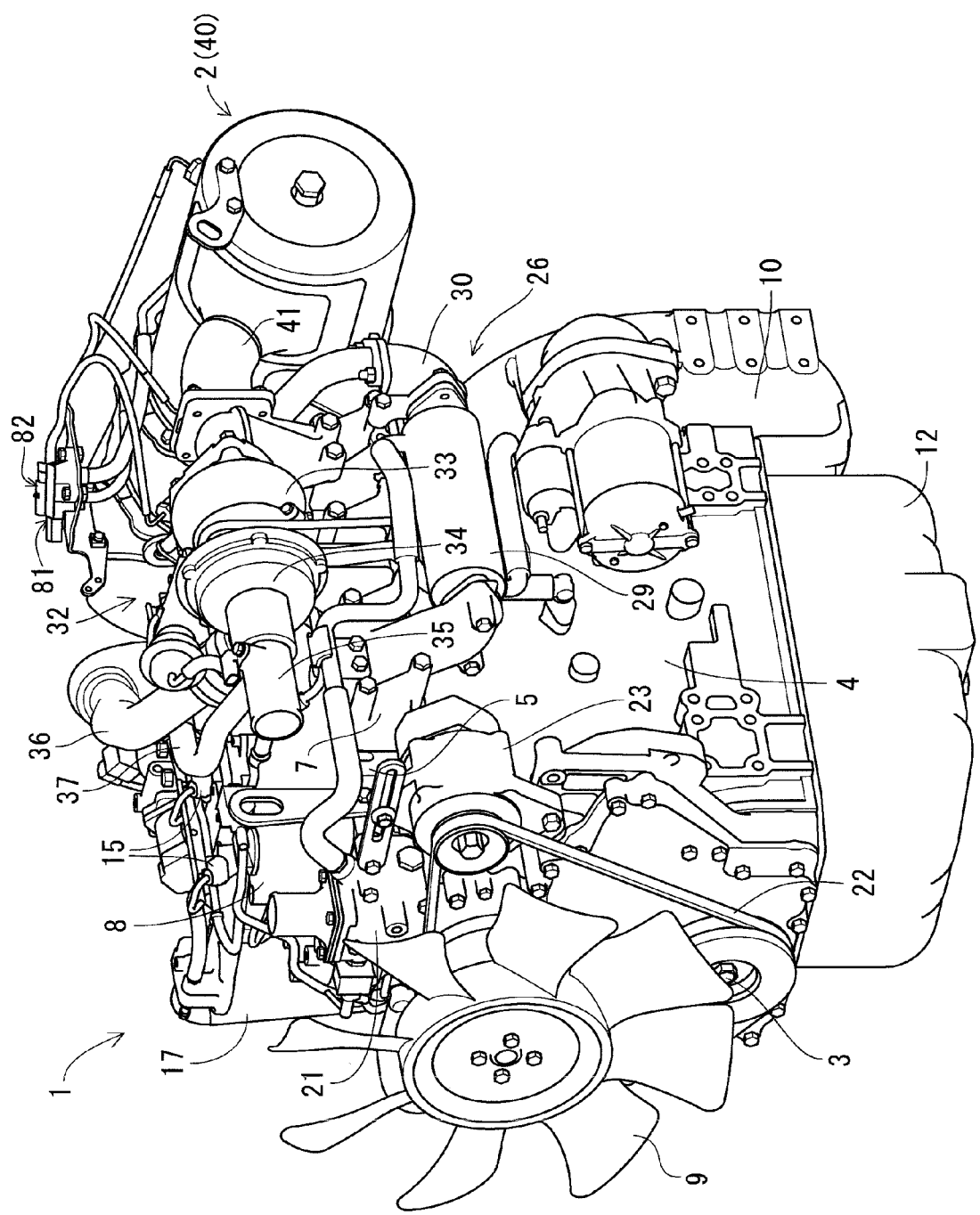
FIG. 1 is a perspective view of an engine as seen from a diagonally forward side.

A description will be given below of an embodiment obtained by embodying the present invention on the basis of the accompanying drawings.

(1) Outline Structure of Engine

First of all, a description will be given of an outline structure of a common rail type engine 1 with reference to FIGS. 1 to 6. In the following description, both side portions which are parallel to a crank axis (side portions in both sides in relation to the crank axis) are called as left and right, a side in which a cooling fan 9 is arranged is called as a front side, a side in which a flywheel housing 10 is arranged is called as a rear side, a side in which an exhaust manifold 7 is arranged is called as a left side, and a side in which an intake manifold 6 is arranged is called as a right side. They are set as the bases of four ways and up and down positional relationships in the engine 1, as a matter of convenience.

As shown in FIGS. 1 to 6, the engine 1 is provided with a continuous regeneration type exhaust gas purification device 2 (a diesel particulate filter, hereinafter refer to as DPF), the engine serving as a prime mover mounted to a working machine such as an agricultural machine or a construction and civil engineering machine. The particulate matter (PM) in an exhaust gas discharged from the engine 1 is removed by the DPF 2, and carbon monoxide (CO) and hydro carbon (HC) in the exhaust gas are reduced by the DPF 2.

The engine 1 is provided with a cylinder block 4 which has a crank shaft 3 serving as an engine output shaft and a piston (not shown) built-in. A cylinder head 5 is mounted onto the cylinder block 4. An intake manifold 6 is arranged in a right side surface of the cylinder head 5, and an exhaust manifold 7 is arranged in a left side surface of the cylinder head 5. An upper surface side of the cylinder head 5 is covered by a head cover 8. Front and rear end sides of the crank shaft 3 are protruded from front and rear side surfaces of the cylinder block 4 respectively. A cooling fan 9 is provided in a front surface side of the engine 1. Rotational power is transmitted from the front end side of the crank shaft 3 to the cooling fan 9 via a cooling fan V belt 22.

A flywheel housing 10 is provided in a rear surface side of the engine 1. A flywheel 11 is accommodated within the flywheel housing 10 in a state in which the flywheel 11 is axially supported to the rear end side of the crank shaft 3. The rotational power of the engine 1 is transmitted to an operating portion of the working machine from the crank shaft 3 via the flywheel 11. An oil pan 12 storing lubricating oil is arranged in a lower surface of the cylinder block 4. The lubricating oil within the oil pan 12 is supplied to each of lubricating portions of the engine 1 via an oil filter 13 which is arranged in a right side surface of the cylinder block 4, and is thereafter returned to the oil pan 12.

A fuel supply pump 14 is provided above the oil filter 13 (below the intake manifold 6) in the right side surface of the cylinder block 4. Further, the engine 1 is provided with injectors 15 for four cylinders, each of the injectors 15 having an electromagnetic switching control type fuel injection valve (not shown). Each of the injectors 15 is connected to a fuel tank (not shown) mounted to the working machine, via the cylinder block 4, a cylindrical common rail 16 (an accumulator) and a fuel filter 17. Fuel in the fuel tank is pressure fed to the common rail 16 from the fuel supply pump 14 via the fuel filter 17, and the fuel having a high pressure is stored in the common rail 16. The high-pressure fuel within the common rail 16 is injected to the cylinders of the engine 1 from the injectors 15 by controlling the fuel injection valve of each of the injectors 15 so as to open and close.

A cooling water pump 21 for lubricating cooling water is arranged in the front surface side of the cylinder block 4 coaxially with a fan axis of the cooling fan 9. The cooling water pump 21 is driven together with the cooling fan 9 via the cooling fan V belt 22, on the basis of the rotational power of the crank shaft 3. The cooling water within a radiator (not shown) mounted to the working machine is supplied to the cylinder block 4 and the cylinder head 5 by driving the cooling water pump 21, and cools the engine 1. The cooling water contributing to the cooling of the engine 1 is returned to the radiator. An alternator 23 is arranged in a left side of the cooling water pump 21.

An engine leg attachment portion 24 is provided in each of the right and left side surfaces of the cylinder block 4. An engine leg body (not shown) having a vibration proofing rubber is fastened by bolts to each of the engine leg attachment portions 24. The engine 1 is supported in a vibration proofing manner to the working machine (more specifically to an engine attachment chassis) via the engine leg bodies.

Figure 2:
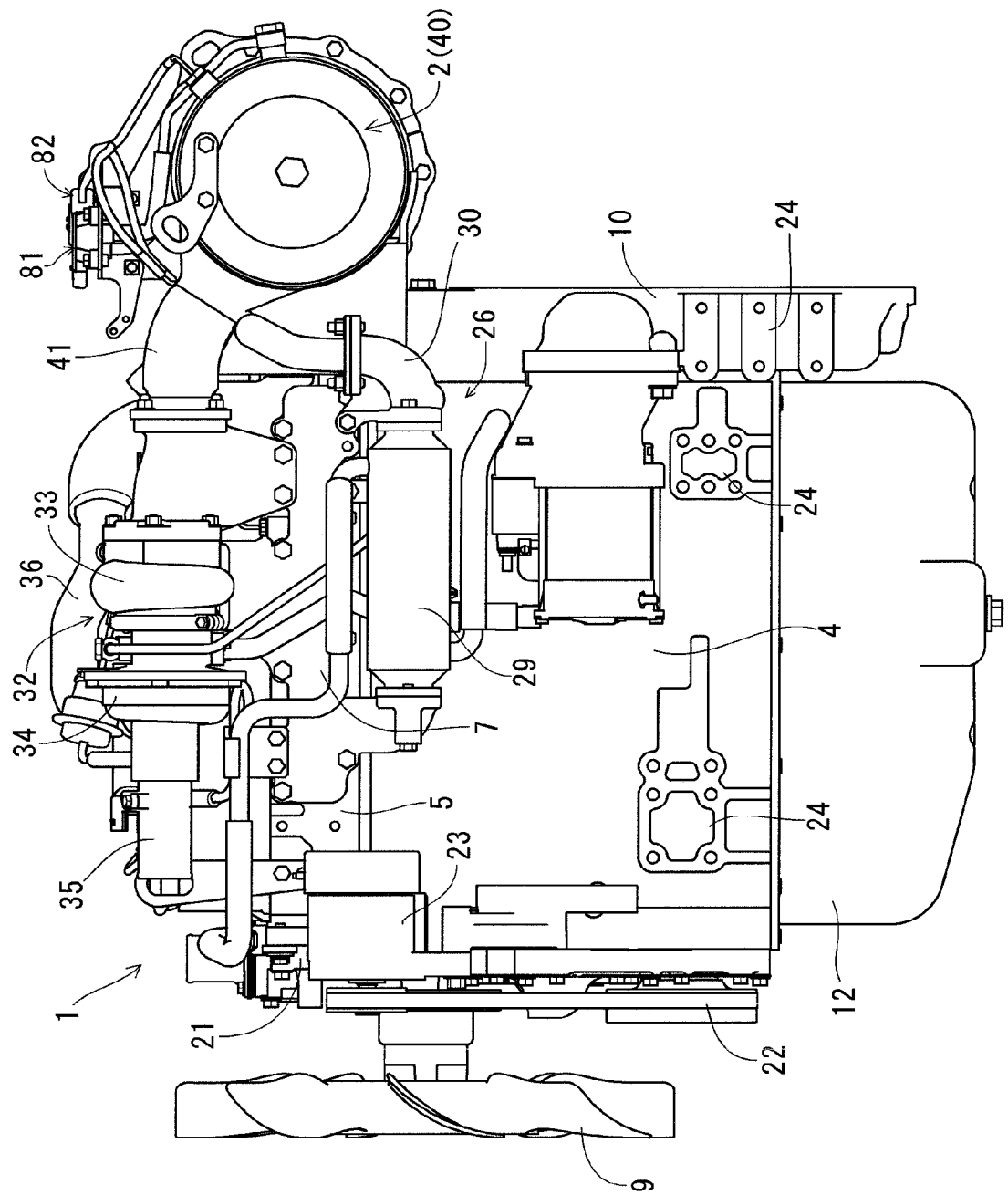
FIG. 2 is a left side elevational view of the engine.
Figure 3:
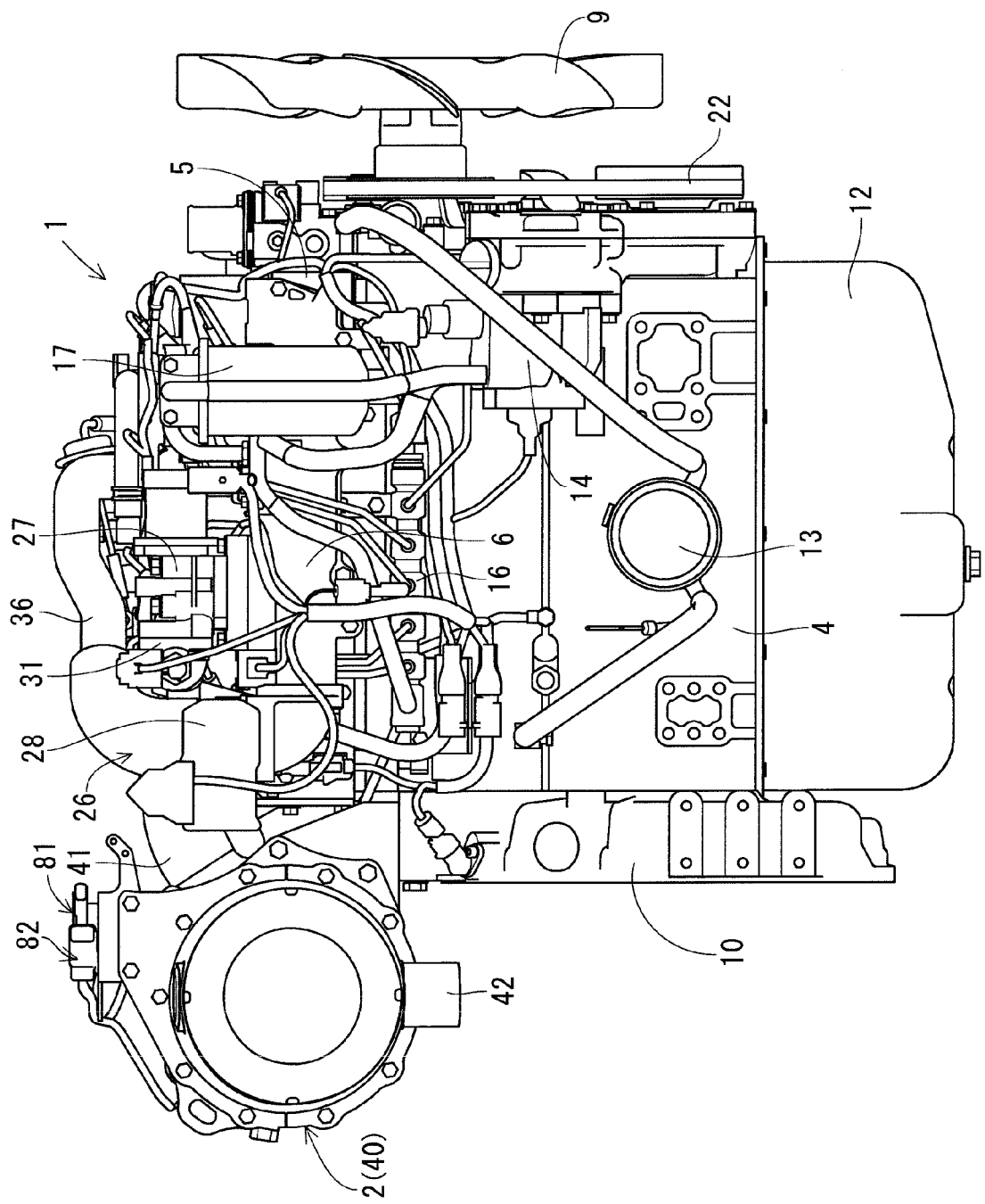
FIG. 3 is a right side elevational view of the engine.
Figure 4:
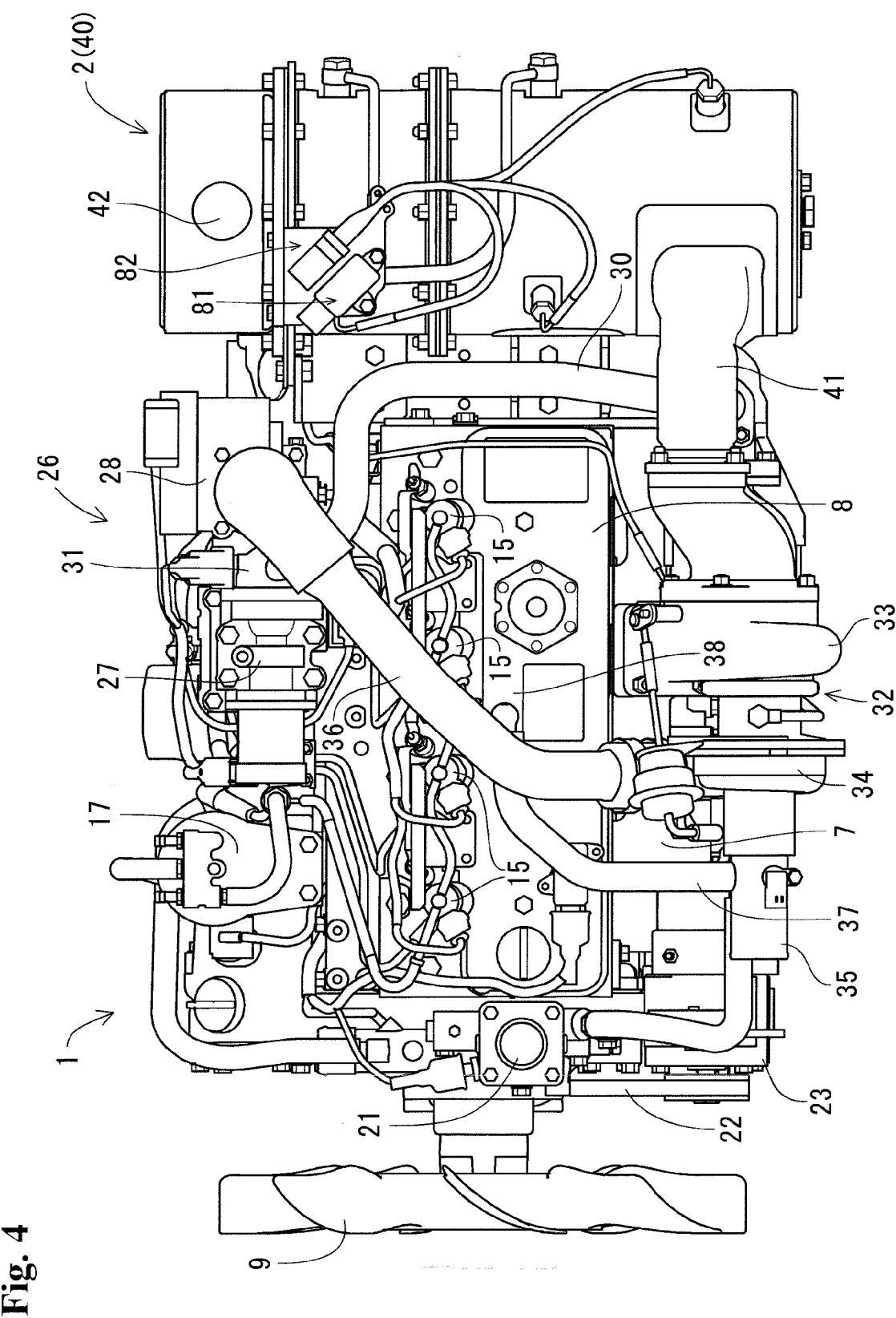
FIG. 4 is a plan view of the engine.
Figure 5:
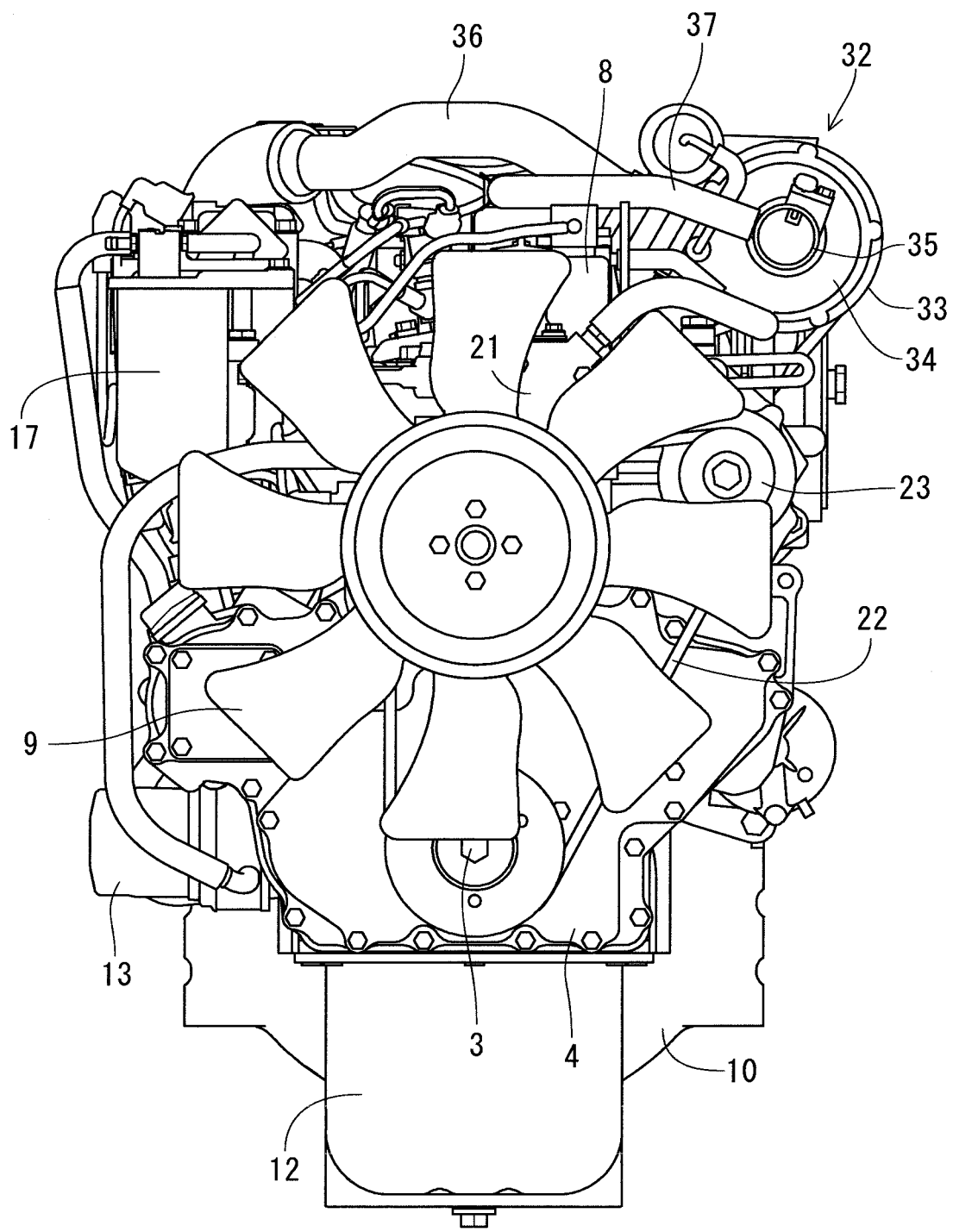
FIG. 5 is a front elevational view of the engine.
Figure 6:
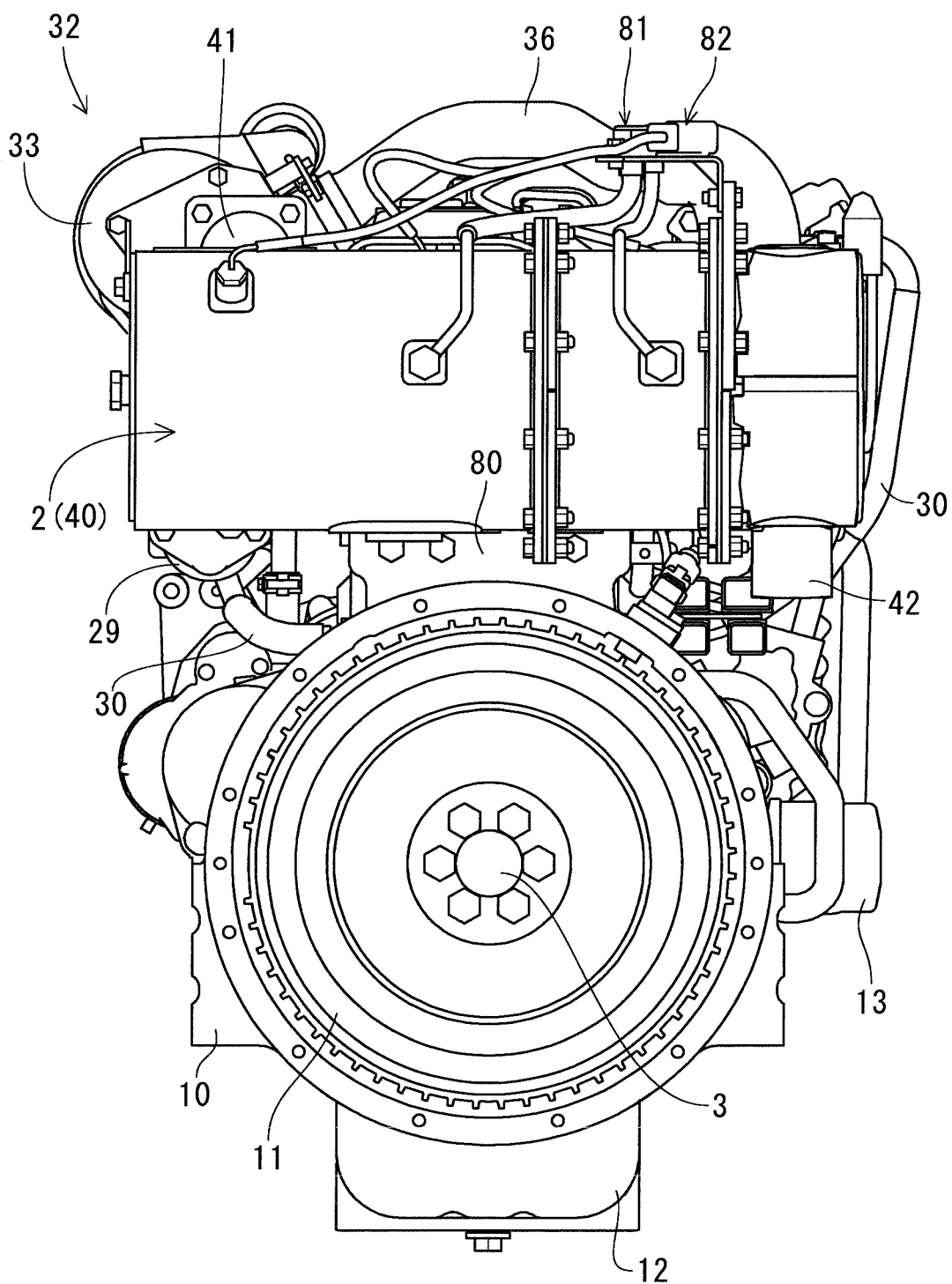
FIG. 6 is a back elevational view of the engine.

As shown in FIGS. 2 and 4, an inlet portion of the intake manifold 6 is connected to an air cleaner (not shown) via an exhaust gas recirculation device 26 (EGR device). Fresh air (external air) sucked into the air cleaner is dust removed and purified by the air cleaner, is thereafter fed to the intake manifold 6 via the EGR device 26, and is supplied to each of the cylinders of the engine 1.

The EGR device 26 is provided with an EGR main body case 27 (a collector) which mixes a part of the exhaust gas of the engine 1 (EGR gas from the exhaust manifold 7) and the fresh air (the external air from the air cleaner) so as to supply to the intake manifold 6, an intake throttle member 28 which communicates the EGR main body case 27 with the air cleaner, a recirculation exhaust gas pipe 30 which connects to the exhaust manifold 7 via an EGR cooler 29, and an EGR valve member 31 which communicates the EGR main body case 27 with the recirculation exhaust gas pipe 30.

The intake throttle member 28 is connected to the intake manifold 6 via the EGR main body case 27. The intake throttle member 28 is fastened by bolts to one end portion in a longitudinal direction of the EGR main body case 27. Right and left inward opening end portions of the EGR main body case 27 are fastened by bolts to an inlet portion of the intake manifold 6. An outlet side of the recirculation exhaust gas pipe 30 is connected to the EGR main body case 27 via the EGR valve member 31. An inlet side of the recirculation exhaust gas pipe 30 is connected to a lower surface side of the exhaust manifold 7 via the EGR cooler 29. A supply amount of the EGR gas to the EGR main body case 27 is adjusted by adjusting an opening degree of an EGR valve (not shown) within the EGR valve member 31.

In the structure mentioned above, the fresh air (the external air) is supplied into the EGR main body case 27 from the air cleaner via the intake throttle member 28. Meanwhile, the EGR gas (a part of the exhaust gas discharged from the exhaust manifold 7) is supplied into the EGR main body case 27 from the exhaust manifold 7 via the EGR valve member 31. After the fresh air from the air cooler and the EGR gas from the exhaust manifold 7 are mixed within the EGR main body case 27, the mixed gas within the EGR main body case 27 is supplied to the intake manifold 6. A maximum combustion temperature at the high-load driving time is lowered and a discharge amount of nitrogen oxide (NOx) from the engine 1 is reduced, by refluxing a part of the exhaust gas discharged from the exhaust manifold 7 to the engine 1 via the intake manifold 6.

As shown in FIGS. 1 to 5, a turbocharger 32 is arranged in a right side of the cylinder head 5 and above the exhaust manifold 7. The turbocharger 32 is provided with a turbine case 33 which has a turbine wheel (not shown) built-in, and a compressor case 34 which has a blower wheel (not shown) built-in. The exhaust gas inlet side of the turbine case 33 is connected to an outlet portion of the exhaust manifold 7. The exhaust gas outlet side of the turbine case 33 is connected to a tail pipe (not shown) via the DPF 2. The exhaust gas discharged to the exhaust manifold 7 from each of the cylinders of the engine 1 is discharged to an external portion from the tail pipe via the turbine case 33 of the turbocharger 32 and the DPF 2.

An intake air inlet side of the compressor case 34 is connected to an air cleaner via an intake pipe 35. An intake air outlet side of the compressor case 34 is connected to the intake throttle member 28 via a supercharger pipe 36. The fresh air in which dust is removed by the air cleaner is fed to the intake manifold 6 from the compressor case 34 via the intake throttle member 28 and the EGR main body case 27, and is supplied to each of the cylinders of the engine 1. The intake pipe 35 is connected to a breather chamber 38 within the head cover 8 via a blow-by gas return pipe 37 (refer to FIG. 7). The blow-by gas from which the lubricating oil is separated and removed in the breather chamber 38 is returned to the intake pipe 35 through the blow-by gas return pipe 37, and is refluxed to the intake manifold 6 so as to be resupplied to each of the cylinders of the engine 1.

Figure 15:
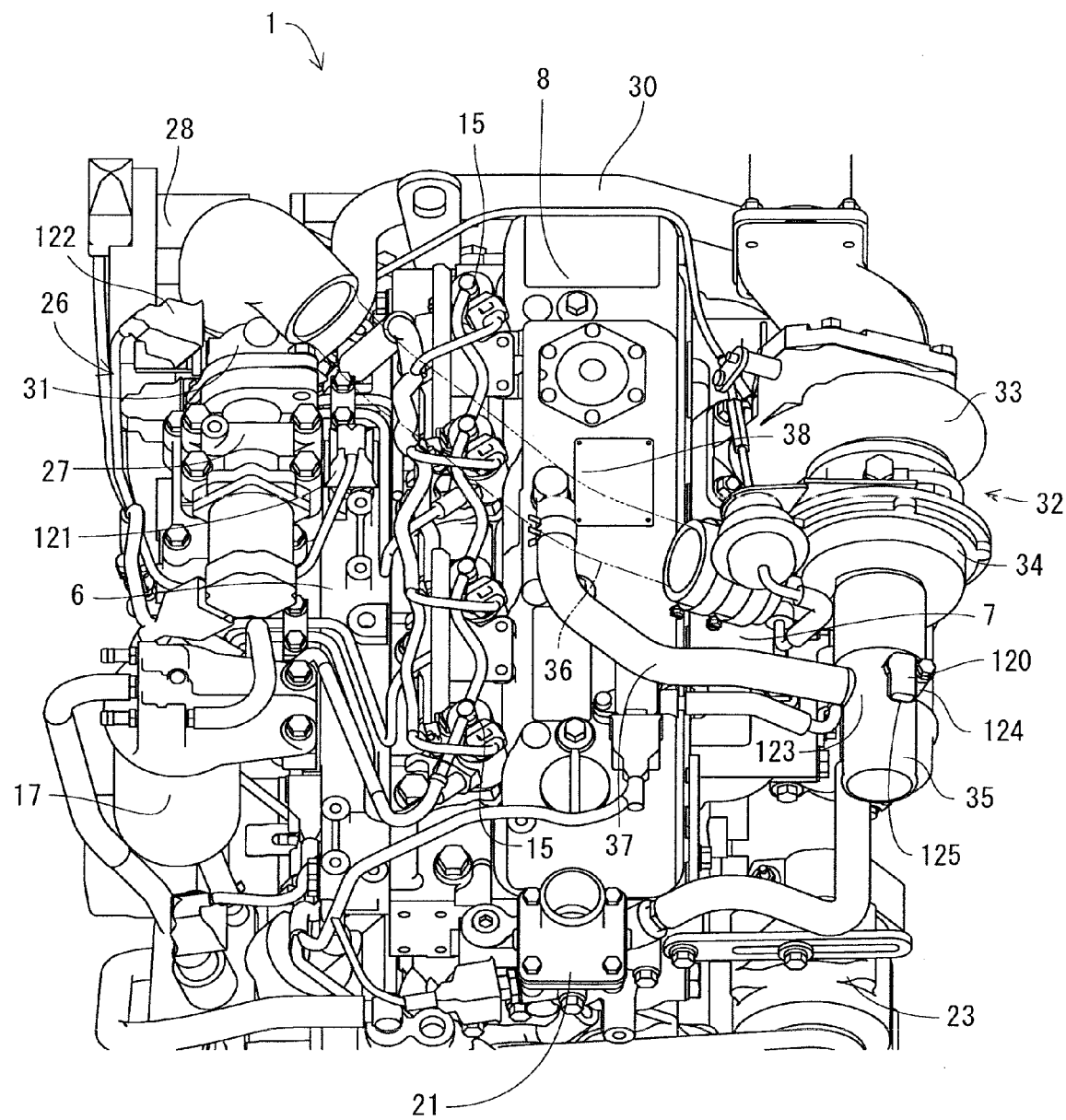
FIG. 15 is an enlarged perspective view of the engine and describes an attachment position of a fresh air temperature sensor.

As in detail shown in FIG. 15, a fresh air temperature sensor 120 detecting a temperature of the fresh air introduced to the intake pipe 35 is attached to the intake pipe 35. A mixed gas temperature sensor 121 detecting a temperature of the mixed gas is attached to the intake manifold 6. Further, an EGR gas temperature sensor 122 detecting a temperature of the EGR gas from the exhaust manifold 7 is attached to the EGR valve member 31. The temperature sensors 120 to 122 attached to the engine side are used for determining an EGR rate of the mixed gas. Here, the EGR rate means a value obtained by dividing the EGR gas amount by sum of the EGR gas amount and the fresh air amount (=EGR gas amount/ (EGR gas amount+fresh air amount)).

The fresh air temperature sensor 120 according to the embodiment is positioned closer to an intake air upstream side than a connection portion 123 to the blow-by gas return pipe 37 in the intake pipe 35. A sensor attachment base 124 is integrally formed in an upper surface side of the intake pipe 35. The fresh air temperature sensor 120 is detachably fastened by bolts to the sensor attachment base 124. A detecting portion of the fresh air temperature sensor 120 protrudes to an inner portion of the intake pipe 35.

According to the structure mentioned above, it is possible to constantly fix an attachment position (layout) of the fresh air temperature sensor 120 in relation to the engine 1, and it is possible to constantly measure the fresh air temperature under the same condition (position) in relation to the engine 1. As a result, correction to a result of detection is not necessary, and it is possible to maintain precision of an engine control on the basis of a simple structure. It is possible to construct a structure of detecting the fresh air temperature at a low cost. Further, since the fresh air temperature sensor 120 is positioned closer to the intake air upstream side than the connection portion 123 to the blow-by gas return pipe 37 in the intake pipe 35, the fresh air temperature can be detected before the blow-by gas is mixed to the fresh air. It is possible to prevent the fresh air temperature sensor 120 from being polluted by the lubricating oil in the blow-by gas. Since the intake air upstream side of the intake pipe 35 is connected to the air cleaner via a rubber hose, vibration applied to the fresh air temperature sensor 120 can be decreased by existence of the rubber hose. As a result, it is possible to improve durability of the fresh air temperature sensor 120.

A fresh air wiring connector 125 is integrally provided in the fresh air temperature sensor 120. In the embodiment, a connecting direction of the fresh air wiring connector 125 is along a longitudinal direction of the intake pipe 35. According to the structure mentioned above, it is possible to make a harness connected to the fresh air wiring connector 125 be along the intake pipe 35, and the existence of the harness does not get in the way.

(2) Outline Structure of DPF

Next, a description will be given of an outline structure of the DPF 2 with reference to FIGS. 7 to 10. The DPF 2 is provided with a purification casing 40 which has a purification inlet pipe 41 and a purification outlet pipe 42 and is made of a heat resisting metal material. A diesel oxidation catalyst 43 such as platinum and a soot filter 44 having a honeycomb structure are accommodated in an inner portion of the purification casing 41 so as to be lined up in series in a moving direction of the exhaust gas (refer to a direction of an arrow in FIG. 9), the diesel oxidation catalyst 43 creating nitrogen dioxide ($NO_2$) and the soot filter 44 continuously oxidizing and removing the collected particulate matter (PM) at a comparatively low temperature. The purification inlet pipe 41 and the purification outlet pipe 42 are provided so as to be distributed to both sides (one end side and the other end side) in a longitudinal direction of the purification casing 40. The purification inlet pipe 41 is connected to the exhaust gas outlet side of the turbine case 33. The purification outlet pipe 42 is connected to a tail pipe (not shown).

In the structure mentioned above, the exhaust gas of the engine 1 flows into the purification casing 40 from the exhaust gas outlet side of the turbine case 33 via the purification inlet pipe 41, and passes through the diesel oxidation catalyst 43 and the soot filter 44 in this order so as to be purification treated. The particulate matter in the exhaust gas cannot pass through a porous partition wall between cells in the soot filter 44 and is collected. Thereafter, the exhaust gas passing through the diesel oxidation catalyst 43 and the soot filter 44 is discharged toward the tail pipe.

If the temperature of the exhaust gas is higher than a regenerable temperature (for example, about 300° C.) when the exhaust gas passes through the diesel oxidation catalyst 43 and the soot filter 44, nitrogen monoxide (NO) in the exhaust gas is oxidized to the unstable nitrogen dioxide on the basis of an action of the diesel oxidation catalyst 43. Further, a particulate matter collecting capacity of the soot filter 44 is recovered (the soot filter 44 is self-regenerated) by oxidizing and removing the particulate matter which piles up on the soot filter 44 by the oxygen (O) discharged when the nitrogen dioxide returns to the nitrogen monoxide.

In the embodiment, the other end side in the longitudinal direction of the purification casing 40 is constructed as a sound absorber 45, and the purification outlet pipe 42 is provided in the sound absorber 45. The diesel oxidation catalyst 43 and the soot filter 44 correspond to a filter body for purifying the exhaust gas.

The purification casing 40 is provided with a catalyst inside case 46 and a catalyst outside case 47, a filter inside case 48 and a filter outside case 49, a sound absorbing inside case 50 and a sound absorbing outside case 51. Respective combinations of the inside cases 46, 48 and 50 and the outside cases 47, 49 and 51 are constructed as double tube structures. The diesel oxidation catalyst 43 is accommodated within the catalyst inside case 46. The soot filter 44 is accommodated within the filter inside case 48. A thin plate support body 52 having an L-shaped cross section is arranged between an outer peripheral side of the catalyst inside case 46 and an inner peripheral side of the catalyst outside case 47. The outer peripheral side of the catalyst inside case 46 and the inner peripheral side of the catalyst outside case 47 are connected via the thin plate support body 52.

The respective combinations of the inside cases 46 and 48 and the outside cases 47 and 49 correspond to the purification cases which are constructing elements of the purification casing 40. The DPF 2 of the embodiment is provided with the sound absorber 45, however, the sound absorber 45 itself is not an essential constructing element for the DPF 2. In other words, the sound absorbing inside case 50 and the sound absorbing outside case 51 are not essential constructing element for the purification casing 40.

A catalyst inner lid body 53 is fixed by welding to one end side of the catalyst inside case 46 and the catalyst outside case 47 (an end portion in an upstream side of the exhaust gas). The one end side of the catalyst inside case 46 and the catalyst outside case 47 is closed by the catalyst inner lid body 53. A catalyst outer lid body 54 covering the catalyst inner lid body 53 from an outer side is fixed by welding to an outer end surface side of the catalyst inner lid body 53. The purification inlet pipe 41 is fixed by welding to an outer peripheral side of the catalyst outside case 47. The purification inlet pipe 41 is communicated with an inner side of the catalyst inside case 46 via an exhaust gas inlet 55 which is formed in the catalyst inside case 46 and the catalyst outside case 47.

A catalyst flange 56 is fixed by welding to the other end side of the catalyst inside case 46 (an end portion in a downstream side of the exhaust gas), the catalyst flange 56 protruding to an outer peripheral side (a radially outer side) of the catalyst outside case 47 and formed into a thin plate. The other end side of the catalyst outside case 47 is fixed by welding to an outer peripheral side of the catalyst flange 56. Meanwhile, a filter inlet flange 57 is fixed by welding to a longitudinally midstream portion in an outer peripheral side of the filter inside case 48, the filter inlet flange 57 protruding to an outer peripheral side of the filter outside case 49 and formed into a thin plate. One end side of the filter outside case 49 (an end portion in the upstream side of the exhaust gas) of the filter outside case 49 is fixed by welding to an outer peripheral side of the filter inlet flange 57.

Figure 7:
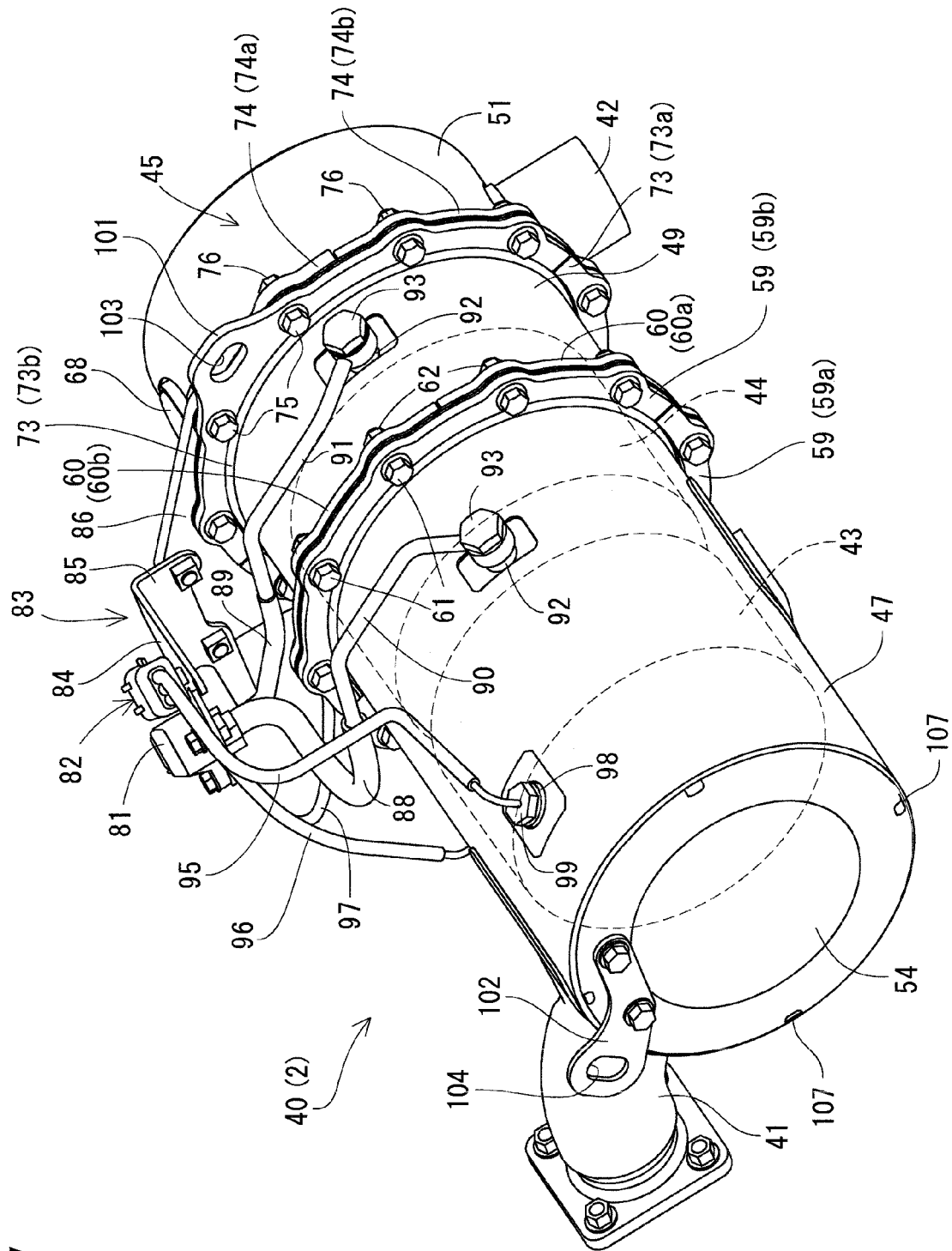
FIG. 7 is a perspective view of an external appearance of a DPF as seen from a purification inlet pipe side.
Figure 8:
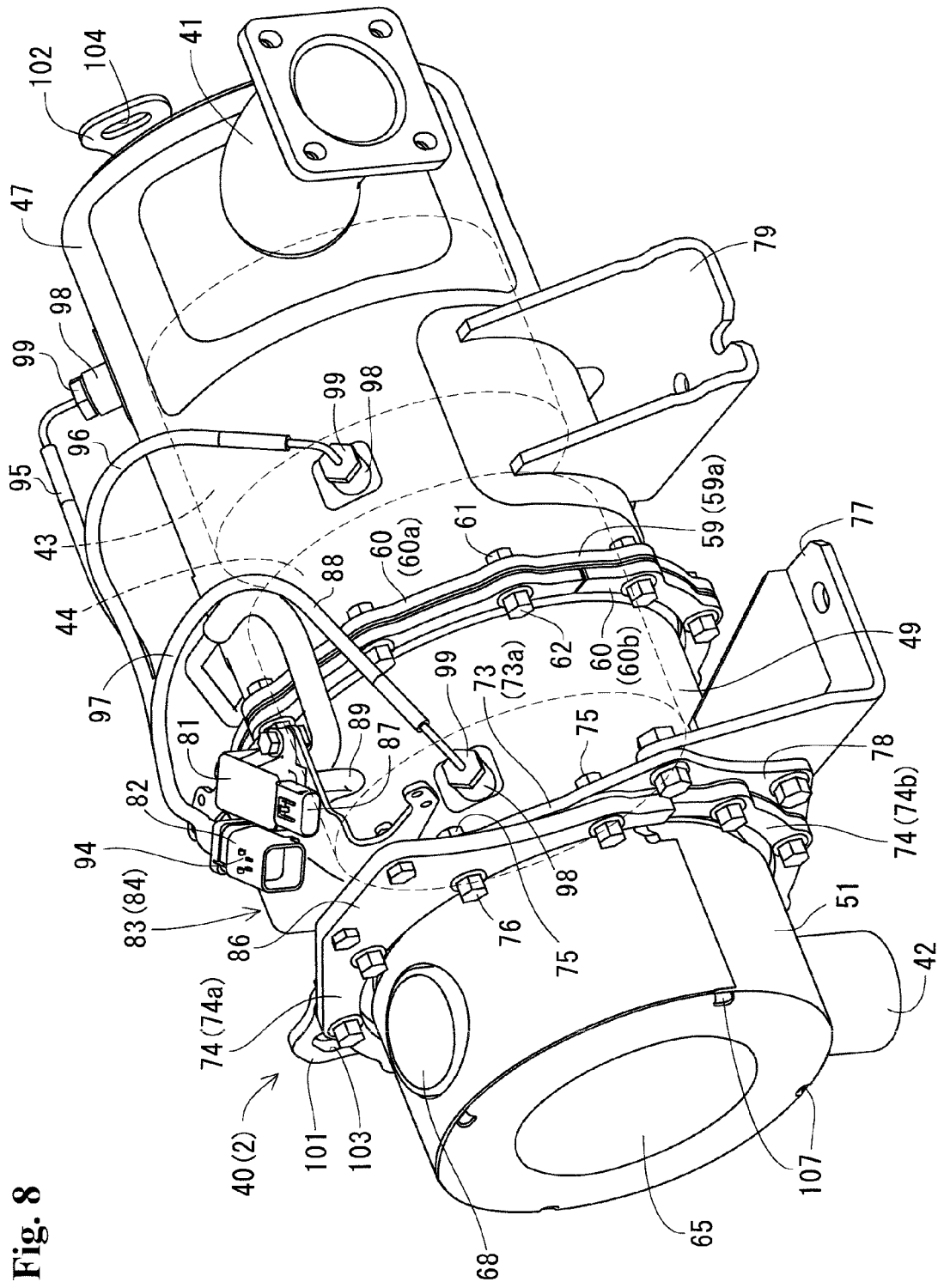
FIG. 8 is a perspective view of an external appearance of the DPF as seen from a purification outlet pipe side.
Figure 9:
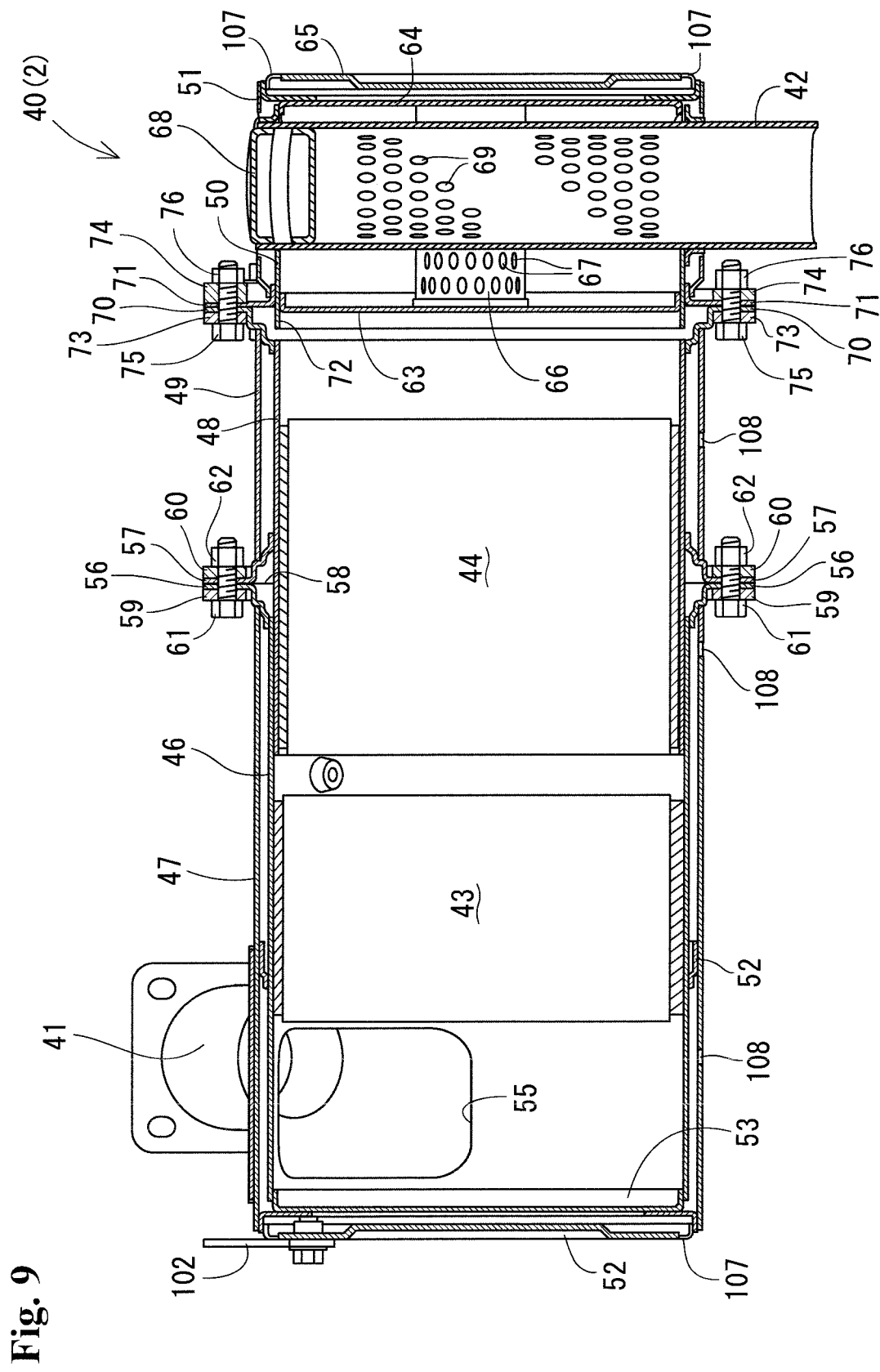
FIG. 9 is an explanatory view of a cross section of the DPF.

As shown in FIGS. 7 to 9, the catalyst outside case 47 and the filter outside case 49 are connected by facing the catalyst flange 56 and the filter inlet flange 57 to each other via a gasket 58, holding both the flanges 56 and 57 from both sides in an exhaust gas moving direction by thick plate-shaped center holding flanges 59 and 60 surrounding outer peripheral sides of the outside cases 47 and 49, and fastening both the center holding flanges 59 and 60 together with both the flanges 56 and 57 by bolts 61 and nuts 62. In a state in which the catalyst outside case 47 and the filter outside case 49 are connected, one end side of the filter inside case 48 overlaps (is inserted) from the other end side of the catalyst inside case 46 and the catalyst outside case 47 into an inner portion.

The sound absorber 45 positioned in the other end side in the longitudinal direction of the purification casing 40 is provided with a sound absorbing inside case 50 and a sound absorbing outside case 51 which have a double tube structure. A partition lid body 63 is fixed by welding to one end side of the sound absorbing inside case 50 (an end portion in the upstream side of the exhaust gas). One end side of the sound absorbing inside case 50 is closed by the partition lid body 63. A sound absorbing inner lid body 64 is fixed by welding to the other end side of the sound absorbing inside case 50 and the sound absorbing outside case 51 (an end portion in the downstream side of the exhaust gas). A sound absorbing outer lid body 65 covering the sound absorbing inner lid body 64 from an outer side is fixed by welding to an outer end surface side of the sound absorbing inner lid body 64.

A pair of communication pipes 66 are provided between the partition lid body 63 and the sound absorbing inner lid body 64 (only one of them is shown in FIG. 9). One end sides of both the communication pipes 66 pass through the partition lid body 63. The other end side of both the communication pipes 66 is closed by the sound absorbing inner lid body 64. A lot of communication holes 67 are formed in each of the communication pipes 66. An inner portion of the sound absorbing inside case 50 partitioned by the partition lid body 63 and the sound absorbing inner lid body 64 is constructed as a resonance chamber which is communicated with both the communication pipes 66 via the communication hole 67.

The purification outlet pipe 42 passing between both the communication pipes 66 is passed through the sound absorbing inside case 50 and the sound absorbing outside case 51. A pair of outlet lid bodies 68 are fixed by welding to one end side (an upper end side) of the purification outlet pipe 42. One end side of the purification outlet pipe 42 is closed by both the outlet lid bodies 68. Both the outlet lid bodies 68 are arranged so as to be appropriately spaced up and down. A lot of exhaust holes 69 are formed in a portion within the sound absorbing inside case 50 in the purification outlet pipe 42. Therefore, both the communication pipes 66 within the sound absorbing inside case 50 are communicated with the purification outlet pipe 42 via the communication hole 67, the resonance chamber and the exhaust hole 69. The other end side (a lower end side) of the purification outlet pipe 42 is connected, for example, to the tail pipe or the existing sound absorbing member. In the structure mentioned above, the exhaust gas inlet intruding into both the communication pipes 66 of the sound absorbing inside case 46 passes through the purification outlet pipe 42 via the communication hole 67, the resonance chamber and the exhaust hole 69, and is discharged out to the sound absorber 45.

A filter outlet flange 70 is fixed by welding to the other end side of the filter inside case 48, the filter outlet flange 70 protruding to an outer peripheral side of the filter outside case 49 and formed into a thin plate shape. The other end side of the filter outside case 49 is fixed by welding to an outer peripheral side of the filter outlet flange 70. Meanwhile, a sound absorbing flange 71 is fixed by welding to one end side of the sound absorbing inside case 50, the sound absorbing flange 71 protruding to an outer peripheral side of the sound absorbing outside case 51 and formed into a thin plate shape. One end side of the sound absorbing outside case 51 is fixed by welding to an outer peripheral side of the sound absorbing flange 71.

As shown in FIGS. 7 to 9, the filter outside case 49 and the sound absorbing outside case 51 are connected by facing the filter outlet flange 70 and the sound absorbing flange 71 to each other via a gasket 72, holding both the flanges 70 and 71 from both sides in an exhaust gas moving direction by outlet holding flanges 73 and 74 which respectively surround an outer peripheral side of the outside cases 49 and 51 and are formed into a thick plate shape, and fastening both the outlet holding flanges 73 and 74 together with both the flanges 70 and 71 by bolts 75 and nuts 76.

The center holding flanges 59 (60) are respectively constructed by circular arc bodies 59a and 59b (60a and 60b)

which are separated into a plurality of sections in a peripheral direction of the corresponding outside case 47 (49). Each of the circular arc bodies 59*a* and 59*b* (60*a* and 60*b*) is formed into a circular arc shape (an approximately semicircular horseshoe shape). In a state in which the catalyst outside case 47 and the filter outside case 49 are connected, end portions of both the circular arc bodies 59*a* and 59*b* (60*a* and 60*b*) face to each other in a peripheral direction, and surround an outer peripheral side of the catalyst outside case 47 (the filter outside case 49). Here, the facing portions of the end portions between the circular arc bodies 59*a* and 59*b* in the catalyst side and the circular arc bodies 60*a* and 60*b* in the filter inlet side are put in positions which are shifted in their phases (the facing portions are not overlapped in the same phase). The respective circular arc bodies 59*a*, 59*b*, 60*a* and 60*b* constructing the center holding flanges 59 and 60 all have the same aspect.

The outlet holding flanges 73 (74) are respectively constructed by circular arc bodies 73*a* and 73*b* (74*a* and 74*b*) which are separated into a plurality of sections in a peripheral direction of the corresponding outside case 49 (51) in the same manner as the center holding flanges 59 and 60. Each of the circular arc bodies 73*a* and 73*b* (74*a* and 74*b*) basically has the same aspect as that of each of the circular arc bodies 59*a* and 59*b* (60*a* and 60*b*) of the center holding flange 59 (60). Facing portions of the end portions between the circular arc bodies 73*a* and 73*b* in the filter outlet side and the circular arc bodies 74*a* and 74*b* in the sound absorbing side are put in positions which are shifted in their phases.

A connection leg body 77 supporting the purification casing 40 to the engine 1 is detachably mounted to at least one of the holding flanges 59, 60, 73 and 74. In the embodiment, a leg body fastening portion 78 with a through hole is formed in one circular arc body 73*a* in the outlet holding flange 73. An attachment boss portion corresponding to the leg body fastening portion 78 of the circular arc body 73*a* is formed in the connection leg body 77. The connection leg body 77 is detachably mounted to the outlet holding flange 73 in the filter outlet side by fastening by bolts the attachment boss portion of the connection leg body 77 to the leg body fastening portion 78 of the circular arc body 73*a*. A fixing leg body 79 is firmly attached by welding to an outer peripheral side of the purification casing 40 (the catalyst outside case 47 in the embodiment), the fixing leg body 79 supporting the purification casing 40 to the engine 1. The connection leg body 77 and the fixing leg body 79 are fastened by bolts to a DPF attachment portion 80 which is formed in an upper surface side of the flywheel housing 10. In other words, the DPF 2 is stably connected and supported onto the flywheel housing 10 by the connection leg body 77 and the fixing leg body 79, the flywheel housing 10 being a high rigidity member.

As shown in FIGS. 7 and 8, an exhaust gas pressure sensor 81 and an exhaust gas temperature sensor 82 are provided in an outer peripheral side of the purification casing 40, the exhaust gas pressure sensor 81 detecting an exhaust gas pressure within the purification casing 40 and the exhaust gas temperature sensor 82 detecting an exhaust gas temperature within the purification casing 40. The exhaust gas pressure sensor 81 is structured such as to detect pressure difference of the exhaust gas between an exhaust gas upstream side and an exhaust gas downstream side in relation to the soot filter 44. A deposition amount of the particulate matter in the soot filter 44 is calculated on the basis of the pressure difference, and a clogging state within the DPF 2 is comprehended.

A sensor bracket 83 is detachably mounted to at least one of the holding flanges 59, 60, 73 and 74, the sensor bracket 83 supporting the exhaust gas pressure sensor 81 and the exhaust gas temperature sensor 82 and approximately formed into an L-shaped form. In the embodiment, a sensor support portion 86 with a through hole is formed in one circular arc body 74*a* in the outlet holding flange 74 in the sound absorbing side. In other words, the sensor support portion 86 is formed in a part of the outlet holding flange 74 in the sound absorbing side which is the farthest from the exhaust gas inlet 55 side. The sensor bracket 83 is detachably mounted to the outlet holding flange 74 in the sound absorbing side by fastening by bolts a vertical plate portion 85 of the sensor bracket 83 to the sensor support portion 86 of the circular arc body 74*a*.

Figure 10:
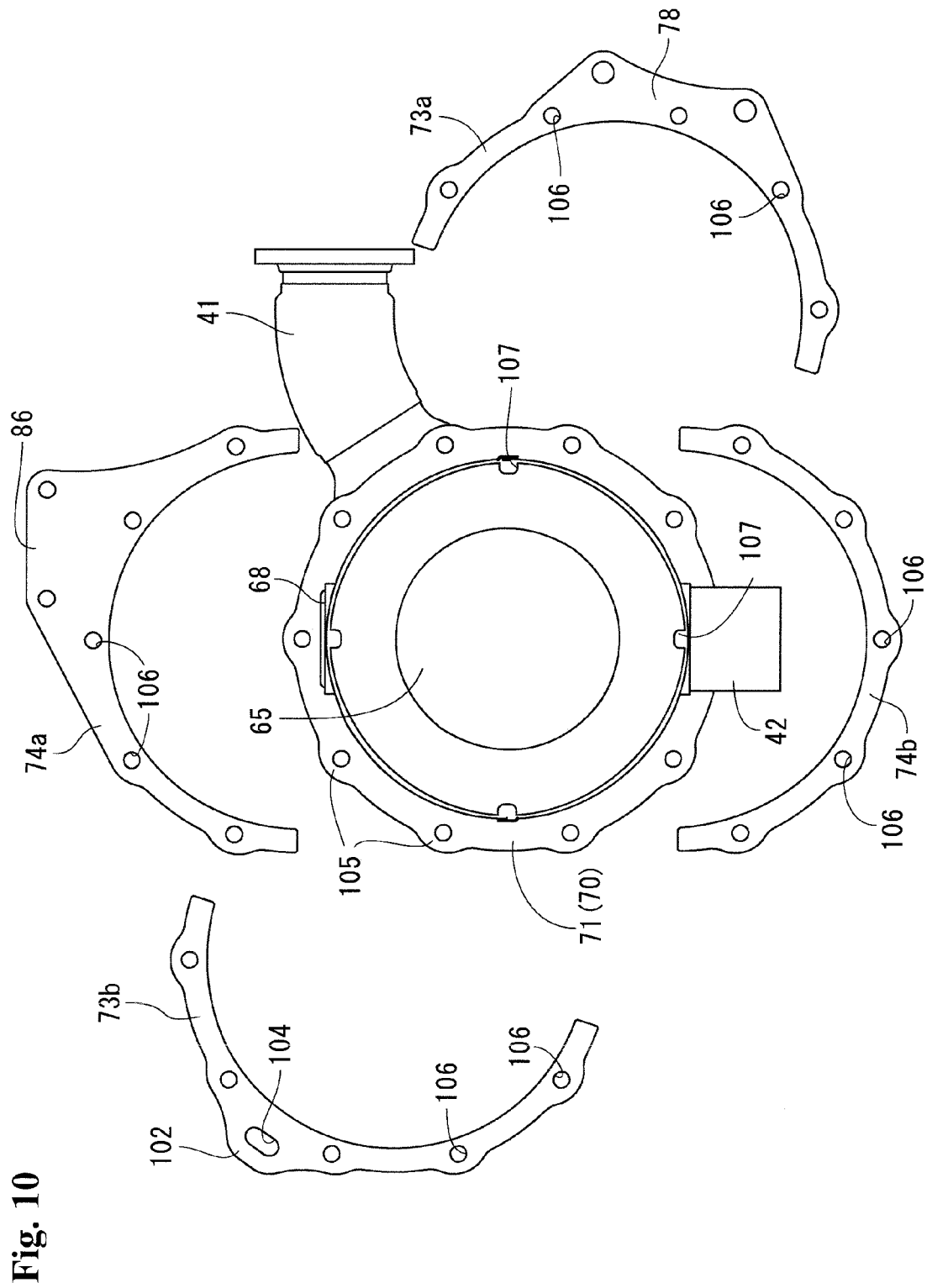
FIG. 10 is a separated side elevational view of a holding flange.

As shown in FIGS. 7, 8 and 10, the sensor support portion 86 of the circular arc body 74*a* protrudes to an outer peripheral side (a radially outer side) of the purification casing 40. As a result, a horizontal plate portion 84 of the sensor bracket 83 is outward away from an outer peripheral side of the purification casing 40. The exhaust gas pressure sensor 81 and the exhaust gas temperature sensor 82 are provided side by side on the horizontal plate portion 84 of the sensor bracket 83. The horizontal plate portion 84 of the sensor bracket 83 is positioned in an outer peripheral side of the filter outside case 49 in such a manner that both the sensors 81 and 82 are accommodated in a length range of the purification casing 40 in the exhaust gas moving direction. With the attachment structure mentioned above, both the sensors 81 and 82 can be accommodated in the length range of the purification casing 40 in the exhaust gas moving direction even in the case that the sound absorber 45 is not directly attached to the DPF 2.

A pressure wiring connector 87 is integrally provided in the exhaust gas pressure sensor 81. Base end sides of upstream and downstream pipe joint bodies 90 and 91 are respectively connected to the exhaust gas pressure sensor 81 via upstream and downstream sensor pipings 88 and 89. A pressure boss body 92 is firmly fixed by welding to the catalyst inside case 46 and the filter inside case 48 in a positional relationship in which the soot filter 44 is held therebetween. Outward protruding end sides of the pressure boss bodies 92 protrude radially outward from an opening which is formed in the corresponding outside case 47 or 49. A leading end side of each of the pipe joint bodies 90 and 91 is fastened to the corresponding pressure boss body 92 via a pipe joint bolt 93.

The exhaust gas temperature sensor 82 is provided with a temperature wiring connector 94 on the horizontal plate portion 84 of the sensor bracket 83. Three sensor pipings 95 to 97 extend from the exhaust gas temperature sensor 82 (which may be called as the temperature wiring connector 94). A temperature boss body 98 is firmly fixed by welding to the catalyst inside case 46 and the filter inside case 48. Two temperature boss bodies 98 are provided in the catalyst inside case 46, and one temperature boss body 98 is provided in the filter inside case 48. The outward protruding end side of the temperature boss bodies 98 protrudes radially outward from an opening which is formed in the corresponding outside case 47 or 49. Detection portions in a leading end of the sensor pipings 95 to 97 extending from the exhaust gas temperature sensor 82 are passed through installation bolts 99 which are threadably engaged with the respective temperature boss bodies 98, and the detection portions in the leading end of the sensor pipings 95 to 97 are fixed to the temperature boss bodies 98 via the installation bolts 99. The detection portions in the leading ends of the sensor pipings 95 to 97 protrude into a portion between the catalyst inner lid body 53 and the diesel oxidation catalyst 43, a portion between the diesel oxidation catalyst 43 and the soot filter 44, and a portion between the soot filter 44 and the partition lid body 63, respectively.

In the embodiment, in a state in which connecting directions are oriented to the same direction between the pressure wiring connector 87 and the temperature wiring connector 94, the exhaust gas pressure sensor 81 and the exhaust gas temperature sensor 82 are fixed onto the horizontal plate portion 84 of the sensor bracket 83. As a result, it is possible to improve a connecting workability of the wiring in relation to each of the connectors 87 and 94.

Figure 11:
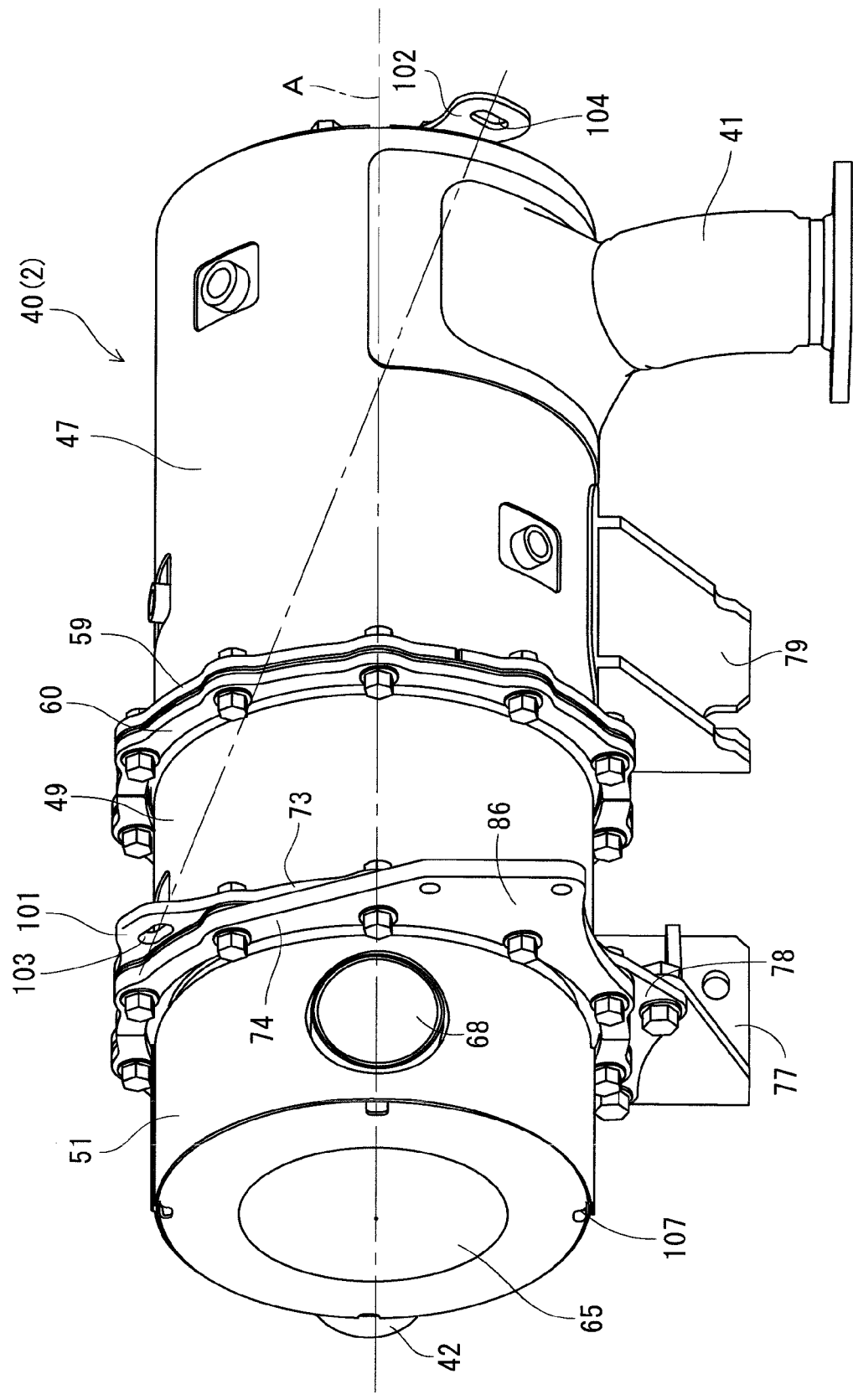
FIG. 11 is a perspective view of an external appearance of the DPF and shows a positional relationship between a suspension body and a suspension bracket.

Further, in the embodiment, a suspension body 101 is integrally formed in the other circular are body 73*b* in the outlet holding flange 73 in the filter outlet side, and a suspension bracket 102 is fastened by bolts to the catalyst outer lid body 54 of the purification casing 40. The suspension body 101 and the suspension bracket 102 are faced to each other so as to be spaced in both sides in the exhaust gas moving direction, in such a manner that opening holes 103 and 104 are positioned in a diagonal direction of the purification casing 40 (an intersecting direction to the longitudinal axis A) (refer to FIG. 11). Not only the outlet holding flange 73 in the filter outlet side, but also the other holding flanges 59, 60 and 74 correspond to the thick flange for connecting the purification case. In other words, the suspension body 101 may be integrally formed in the other holding flanges 59, 60 and 74.

According to the structure mentioned above, the suspension body 101 and the suspension bracket 102 can be locked, for example, to a hook (not shown) of a chain block, the purification casing 40 can be moved up and down by the chain block, and the purification casing 40 can be assembled in the engine 1, in an assembling plant of the engine 1. In other words, a worker can smoothly mount the purification casing 40 to the engine 1 by using the suspension body 101 and the suspension bracket 102 without lifting up the purification casing 40 by oneself.

Further, the purification casing 40 which is a heavy load can be suspended down under a stable attitude on the basis of a positional relationship in the diagonal direction of the suspension body 101 and the suspension bracket 102, and it is possible to easily carry out alignment between the DPF attachment portion 80 of the flywheel housing 10, and the connection leg body 77 and the fixing leg body 79, for example. Accordingly, it is possible to improve an assembling workability of the DPF 2.

In the meantime, a plurality of bolt fastening portions 105 with through holes are provided in each of the holding flanges 59, 60, 73 and 74 corresponding to the thick flange at uniform distances along the peripheral direction. In the embodiment, the bolt fastening portions 105 are provided at ten positions every one set of the holding flanges 59, 60, 73 and 74. In the case of each unit of the circular arc bodies 59*a*, 59*b*, 60*a*, 60*b*, 73*a*, 73*b*, 74*a* and 74*b*, the bolt fastening portions 105 are provided at five positions at uniform distances along the peripheral direction. Bolt holes 106 corresponding to the bolt fastening portions 105 of the holding flanges 59, 60, 73 and 74 are formed in each of the flanges 56, 57, 70 and 71. As a result, an attachment phase of the circular arc bodies 59*a*, 59*b*, 60*a*, 60*b*, 73*a*, 73*b*, 74*a* and 74*b* group of the respective holding flanges 59, 60, 73 and 74 can be changed in multiple stages around the longitudinal axis A in the exhaust gas moving direction of the purification casing 40 (along the peripheral direction of the purification casing 40).

According to the structure mentioned above, the position of the suspension body 101 can be easily changed in relation to the connecting direction of the purification inlet pipe 41 and the purification outlet pipe 42 (the attachment specification of the DPF 2 in relation to the engine 1), without changing the shape of each of the holding flanges 59, 60, 73 and 74 (the forming position of the suspension body 101), and it is possible to contribute to further improvement of the assembling workability of the DPF 2.

As in detail shown in FIG. 9, the lid bodies are constructed as double structures having the inner lid bodies 53 and 64 and the outer lid bodies 54 and 65, the lid bodies closing both end portions in the exhaust gas moving direction of the purification casing 40. Further, a first drain hole 107 is formed at a position at least in a lower portion in the outer lid bodies 54 and 65 in a state in which the purification casing 40 is mounted to the engine 1, the first drain hole 107 discharging water which is accumulated between the inner lid bodies 53 and 64 and the outer lid bodies 54 and 65 (refer to FIGS. 7 to 11). The outer lid bodies 54 and 65 are formed into the same shape of approximately disc form. The first drain hole 107 is formed in a peripheral edge portion in a radial direction on the basis of a center line (the longitudinal axis A) in the exhaust gas moving direction in each of the outer lid bodies 54 and 65. The first drain hole 107 according to the embodiment is open to a peripheral edge portion in a crisscross direction as seen from the center line (the longitudinal axis A) in the exhaust gas moving direction (open at four positions in relation to one outer lid body 54 or 65). The portions between the inner lid bodies 53 and 64 and the outer lid bodies 54 and 65 are communicated with the external portion via the first drain holes 107.

According to the structure mentioned above, in spite of the fact that a heat insulating property is secured by closing both the end portions in the exhaust gas moving direction of the purification casing 40 with the double structures of the inner lid bodies 53 and 64 and the outer lid bodies 54 and 65, it is possible to discharge the water accumulated between the inner lid bodies 53 and 64 and the outer lid bodies 54 and 65 due to dew condensation or rain water from the first drain hole 107, and a drainage capacity of the DPF 2 is improved. As a result, a corrosion resistance of the DPF 2 is improved. In addition, since both the end portions in the exhaust gas moving direction of the purification casing 40 are closed by the outer lid bodies 54 and 65 having the same shape, it is possible to reduce the constructing parts number so as to contribute to a cost reduction. It is possible to easily change the attaching directions around the center axis (the longitudinal axis A) of the outer lid bodies 54 and 65 in relation to each of the end portions in the exhaust gas moving direction of the purification casing 40, without changing the shapes of the outer lid bodies 54 and 65. Further, it is possible to enhance degree of freedom of the attaching direction of the outside case (for example, the catalyst outside case 47 and the sound absorbing outside case 51) in relation to the engine 1.

Figure 12:
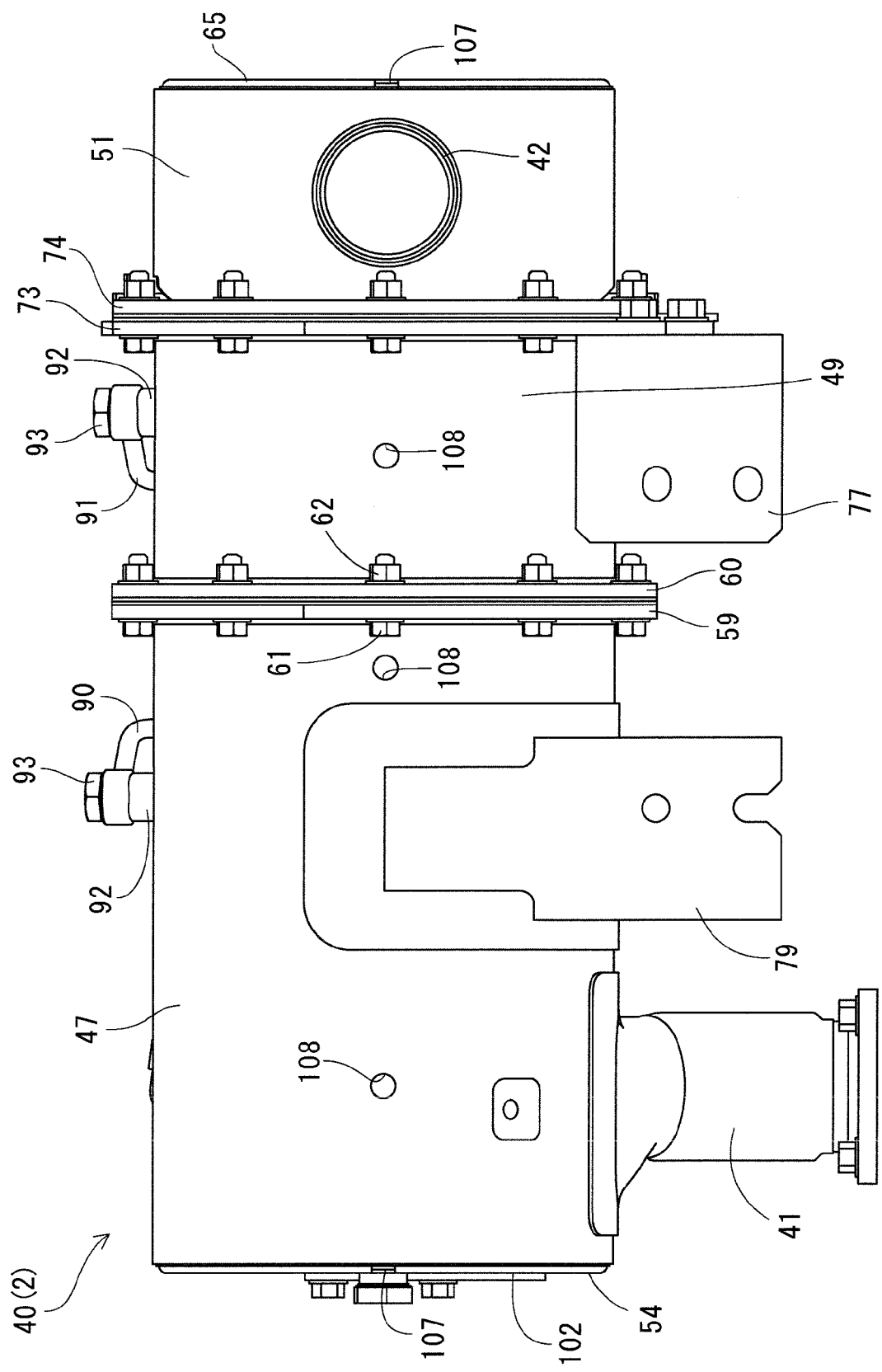
FIG. 12 is a bottom elevational view of the DPF.

As shown in FIG. 12, a second drain hole 108 is formed at a position at least in a lower portion in each of the outside cases 47 and 49 in a state in which the purification casing 40 is mounted to the engine 1, the second drain hole 108 discharging the water accumulated between the inside cases 46 and 48 and the outside cases 47 and 49. In the embodiment, the second drain hole 108 is formed at three positions including both sides in relation to the fixing leg body 79 in the catalyst outside case 47 and the filter outside case 49. With the structure mentioned above, in spite of the fact that the purification casing 40 is constructed as the double structures of the inside cases 46 and 48 and the outside cases 47 and 49 so as to secure the heat insulating property, it is possible to discharge the water accumulated between the inside cases 46 and 48 and the outside cases 47 and 49 due to the dew condensation or the rain water from the second drain hole 108, and the drainage capacity of the DPF 2 is improved. As a result, it is possible to contribute to further improvement of the corrosion resistance of the DPF 2.

Figure 13:
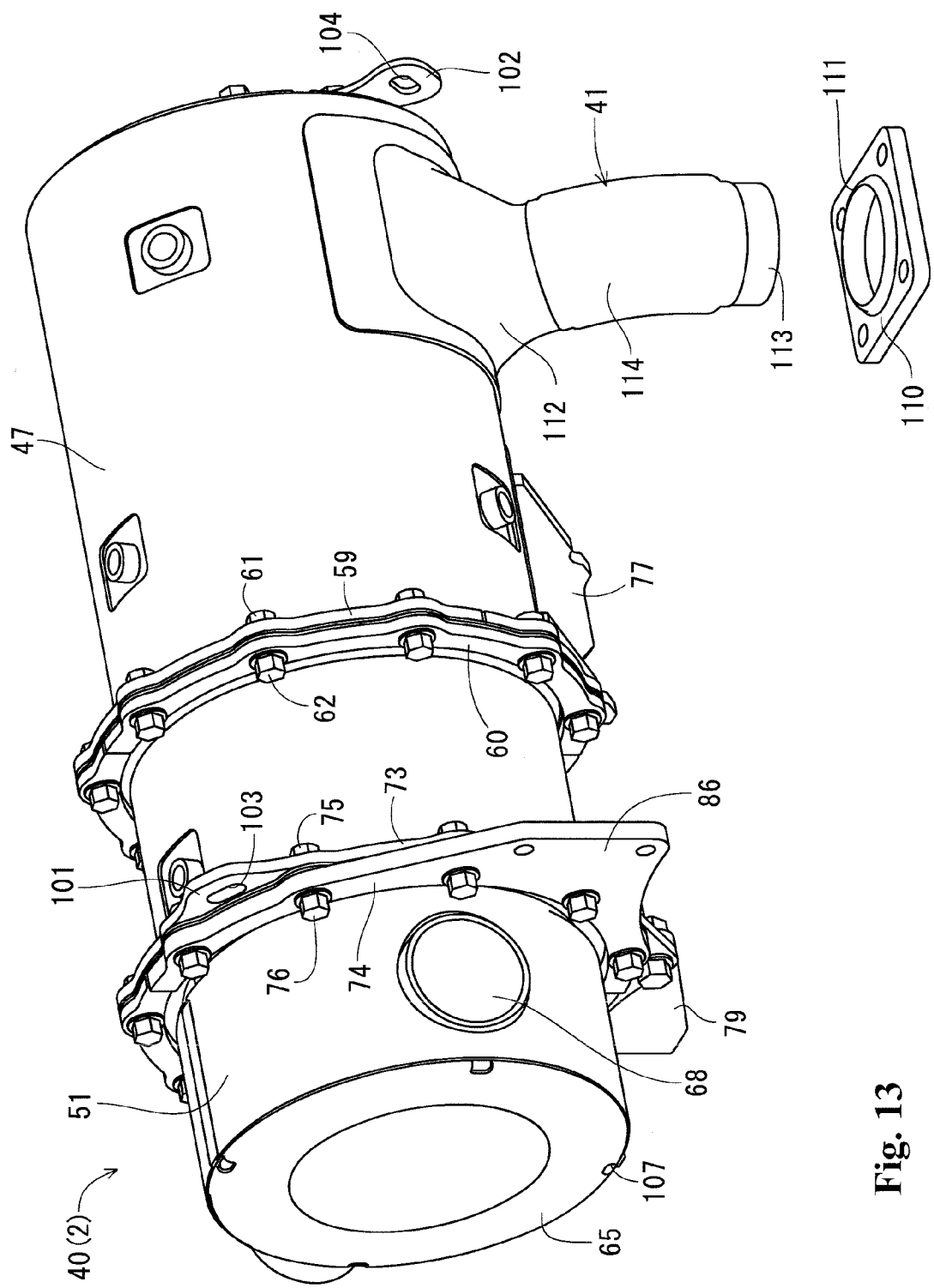
FIG. 13 is a perspective view of an external appearance of the DPF in a state in which a connection flange body is separated.
Figure 14:
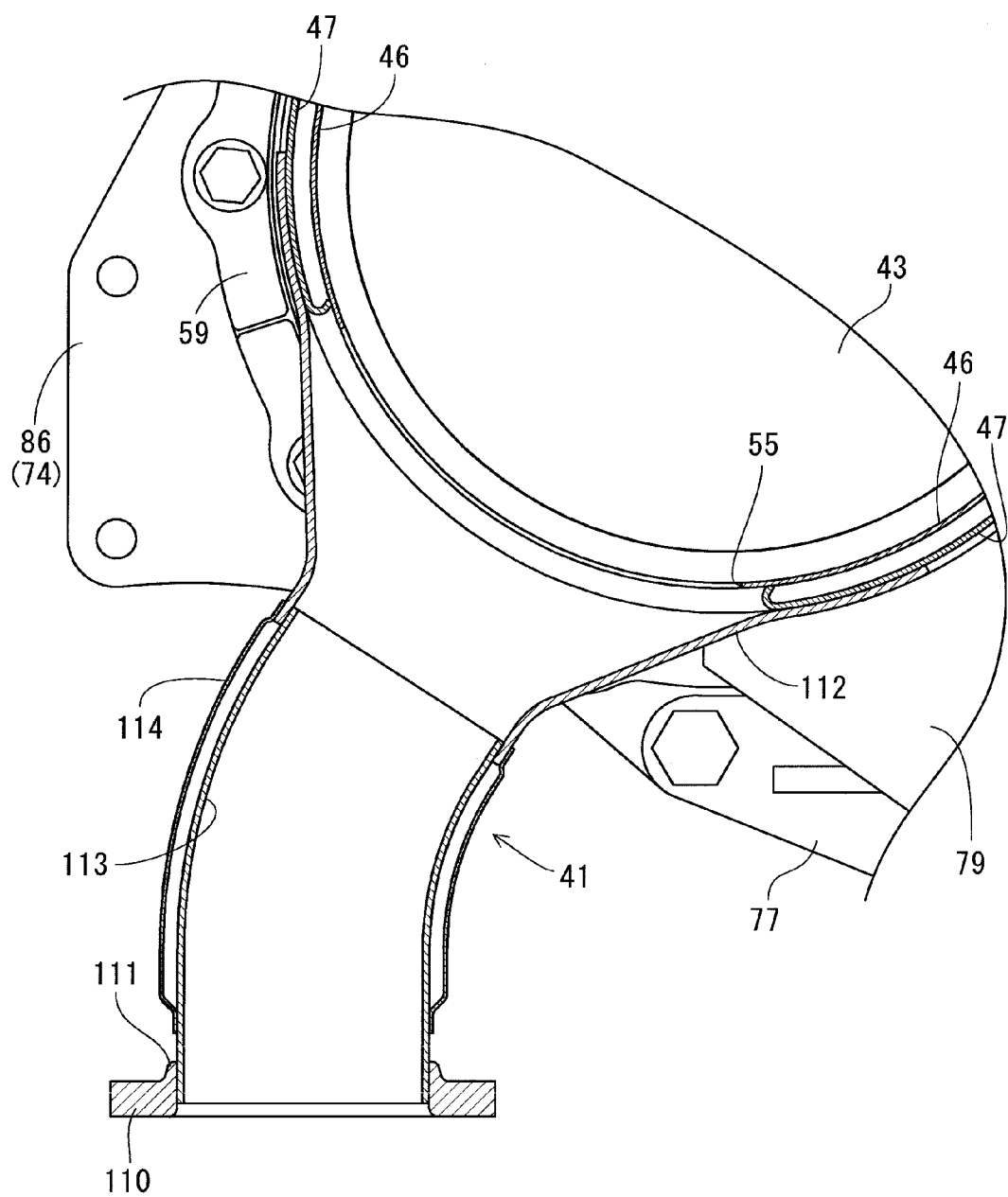
FIG. 14 is an enlarged cross-sectional view of the purification inlet pipe.

As shown in FIGS. 13 and 14, a connection flange body 110 is firmly fixed by welding to a leading end side of the purification inlet pipe 41 which is provided in an outer peripheral side of the catalyst outside case 47, the connection flange body 110 being fastened to the exhaust gas outlet side of the turbine case 33. An annular projection portion 111 is integrally formed in the connection flange body 110 by protruding an opening edge portion formed in the center in a direction of the purification inlet pipe 41. The annular projection portion 111 of the connection flange body 110 and the leading end outer peripheral side of the purification inlet pipe 41 are welded by inserting the purification inlet pipe 41 to the opening portion in the center of the connection flange body 110.

With the structure mentioned above, since the weld portion to the leading end outer peripheral side of the purification inlet pipe 41 is spaced from a flat portion of the connection flange body 110, adverse effect of high heat due to the welding is hard to be applied to the connection flange body 110 in spite of the fact that the connection flange body 110 is firmly fixed by welding to the purification inlet pipe 41. As a result, it is possible to maintain a flatness of a flat portion of the connection flange body 110. Therefore, it is possible to suppress risk that the stress causing the breakage of the DPF 2 is locally generated in the connection flange body 110.

As shown in FIGS. 13 and 14, the purification inlet pipe 41 is constructed as the double tube structure. The purification inlet pipe 41 according to the embodiment is constructed by a funnel-like portion 112 which covers the exhaust gas inlet 55 formed in the catalyst outside case 47 from an outer side and is formed into a tapered shape, an inner tube portion 113 which is inserted and fixed to a leading end opening portion of the funnel-like portion 112, and an outer tube portion 114 which is fitted to the inner tube portion 113. A base end side of the funnel-like portion 112 is fixed by welding to the outer peripheral side of the catalyst outside case 47. An overlapping position of the leading end side of the funnel-like portion 112 to which the inner tube portion 113 is inserted, and the base end side of the outer tube portion 114 is fixed by welding. The leading end side of the outer tube portion 114 is fixed by welding to the inner tube portion 113. The leading end side of the inner tube portion 113 protrudes out of the outer tube portion 114, and the connection flange body 110 is fixed by welding to the portion. With the structure mentioned above, the heat insulating property is improved not only in the purification casing 40 but also in the purification inlet pipe 41. As a result, it is possible to suppress the temperature reduction of the exhaust gas within the purification casing 40. Further, it is possible to prevent the temperature rise within the arranged space (for example, the hood of the working machine) of the engine 1, and it is possible to suppress heat balance deterioration.

As shown in FIG. 9, the purification outlet pipe 42 passes through the purification casing 40. In the embodiment, the purification outlet pipe 42 is passed through the sound absorbing inside case 50 and the sound absorbing outside case 51. One end side (an upper end side) which corresponds to an end portion in a closed side of the purification outlet pipe 42 is constructed as a double wall structure. In this case, a pair of outlet lid bodies 68 are fixed by welding to one end side of the purification outlet pipe 42, and one end side of the purification outlet pipe 42 is closed by both the outlet lid bodies 68. Both the outlet lid bodies 68 are arranged up and down so as to be appropriately spaced. An air layer between both the outlet lid bodies 68 serves as a heat insulating layer. With the structure mentioned above, the heat insulating property is improved not only in the purification casing 40 and the purification inlet pipe 41 but also in the purification outlet pipe 42. As a result, it is possible to further suppress the temperature reduction of the exhaust gas within the purification casing 40.

Further, it is possible to prevent the temperature rise within the arranged space (for example, the hood of the working machine) of the engine 1, and it is possible to more securely suppress the heat balance deterioration.

(3) Summary

As is apparent from the structure mentioned above, in the exhaust gas purification device 2 provided with a plurality of filter bodies 43 and 44 which purify the exhaust gas discharged by the engine 1, the purification casing 40 having each of the filter bodies 43 and 44 built-in and constructed by a plurality of purification cases 46 to 49, the exhaust gas pressure sensor 81 which detects the exhaust gas pressure within the purification casing 40, and the exhaust gas temperature sensor 82 which detects the exhaust gas temperature within the purification casing 40, both the sensors 81 and 82 are arranged in the outer peripheral side of the purification casing 40 so as to be accommodated within the length range in the exhaust gas moving direction of the purification casing 40. As a result, it is possible to reduce a man hour for evaluation such as a design and a test, without necessity of evaluating whether or not the initial setting (adjustment) of each of the sensors 81 and 82 is proper for every specification of the engine 1 or every working machine. It is possible to achieve standardization of the constructing parts relating to the exhaust gas purification device 2. Since the attachment positions of both the sensors 81 and 82 are accommodated within the length range in the exhaust gas moving direction of the purification casing 40, it is possible to do away with the influence of both the sensors 81 and 82 applied to the total length in the exhaust gas moving direction of the purification casing 40 (the exhaust gas purification device 2). As a result, it is possible to compactly arrange the exhaust gas purification device 2 including both the sensors 81 and 82 within the arranged space of the engine 1.

Further, the sensor bracket 83 is detachably mounted to the sensor support portion 86 which is provided in a part of the flanges 59, 60, 73 and 74 of the purification cases 46 to 49 group, and both the sensors 81 and 82 are provided in the sensor bracket 83. As a result, both the sensors 81 and 82 can be supported to the flanges 59, 60, 73 and 74 having the high rigidity, and it is possible to reduce the vibration transmitted to both the sensors 81 and 82. Accordingly, it is possible to suppress the adverse effect applied to the detecting precision of both the sensors 81 and 82. It is possible to prevent both the sensors 81 and 82 from dropping.

Further, the sensor support portion 86 is formed in a part of the flange 74 which is the furthest from the exhaust gas inlet 55 side in the purification cases 46 to 49 group, the horizontal plate portion 84 of the sensor bracket 83 is at the position which is outward away from the outer peripheral side of the purification casing 40, and both the sensors 81 and 82 are provided side by side on the horizontal plate portion 84. As a result, the heat generated by the exhaust gas purification device 2 is hard to be transferred to both the sensors 81 and 82. Therefore, it is possible to suppress malfunction of both the sensors 81 and 82 due to overheat in spite of the fact that both the sensors 81 and 82 are assembled in the exhaust gas purification device 2. In addition, since the exhaust gas purification device 2 comes close to both the sensors 81 and 82, it is possible to shorten the length of each of the sensor pipings 88, 89, and 95 to 97 which connect the exhaust gas purification device 2 and both the sensors 81 and 82, and it is possible to achieve improvement in the assembling workability and a cost reduction.

As is apparent from the description mentioned above, and FIGS. 7, 8 and 11, in the exhaust gas purification device 2 provided with a plurality of filter bodies 43 and 44 which purify the exhaust gas discharged by the engine 1, and the purification casing 40 which has the filter bodies 43 and 44 built-in and is constructed by a plurality of purification cases 47, 49 and 51, the purification casing 40 is constructed by lining up each of the purification cases 47, 49 and 51 in the exhaust gas moving direction so as to connect by the thick flanges 59, 60, 73 and 74, and the suspension body 101 is integrally formed in the thick flange 73. As a result, for example, in the assembling plant of the engine 1, the suspension body 101 and the suspension bracket 102 can be locked, for example, to the hook (not shown) of the chain block, the purification casing 40 can be moved up and down by the chain block, and the purification casing 40 can be assembled in the engine 1. In other words, the worker can smoothly mount the purification casing 40 to the engine 1 by using the suspension body 101 and the suspension bracket 102 without lifting up the purification casing 40 by oneself.

As is apparent from the description mentioned above and FIG. 11, while the suspension body 101 is arranged in one end side in the exhaust gas moving direction of the purification casing 40, the suspension bracket 102 is arranged in the other end side in the exhaust gas moving direction of the purification casing 40, and the suspension body 101 and the suspension bracket 102 are faced in both sides in the exhaust gas moving direction so as to be spaced, in such a manner that the opening holes 103 and 104 are positioned in the direction intersecting the longitudinal axis A in the exhaust gas moving direction of the purification casing 40. As a result, the purification casing 40 which is the heavy load can be suspended down under the stable attitude on the basis of the positional relationship in the diagonal direction of the suspension body 101 and the suspension bracket 102, and it is possible to easily carry out the alignment between the DPF attachment portion 80 of the flywheel housing 10, and the connection leg body 77 and the fixing leg body 79. Accordingly, it is possible to improve the assembling workability of the exhaust gas purification device 2.

As is apparent from the description mentioned above and FIGS. 10 and 11, the exhaust gas purification device is structured such that the attachment angle of the thick flanges 59, 60, 73 and 74 can be changed around the longitudinal axis A in the exhaust gas moving direction of the purification casing 40. As a result, the position of the suspension body 101 can be easily changed in relation to the connecting direction of the purification inlet pipe 41 and the purification outlet pipe 42 (the attachment specification of the exhaust gas purification device 2 in relation to the engine 1), without changing the shape of each of the thick flanges 59, 60, 73 and 74 (the forming position of the suspension body 101), and it is possible to contribute to the further improvement of the assembling workability of the exhaust gas purification device 2.

As is apparent from the description mentioned above and FIGS. 7 to 12, in the exhaust gas purification device provided with a plurality of filter bodies 43 and 44 which purify the exhaust gas discharged by the engine 1, a plurality of inside cases 46, 48 and 50 which have each of the filter bodies 43 and 44 built-in, and a plurality of outside cases 47, 49 and 51 which have each of the inside cases 46, 48 and 50 built-in, and constructing the purification casing 40 by lining up and connecting each of the outside cases 47, 49 and 51 in the exhaust gas moving direction, the lid bodies closing both the end portions in the exhaust gas moving direction of the purification casing 40 are constructed as the double structure including the inner lid bodies 53 and 64 and the outer lid bodies 54 and 65, and the first drain hole 107 is formed at the position at least in the lower portion in the outer lid bodies 54 and 65 in the state in which the purification casing 40 is mounted to the engine 1, the first drain hole 107 discharging the water which is accumulated between the inner lid bodies 53 and 64 and the outer lid bodies 54 and 56. As a result, in spite of the fact that the heat insulating property is secured by closing both the end portions in the exhaust gas moving direction of the purification casing 40 with the double structures of the inner lid bodies 53 and 64 and the outer lid bodies 54 and 65, it is possible to discharge the water accumulated between the inner lid bodies 53 and 64 and the outer lid bodies 54 and 65 due to the dew condensation or the rain water from the first drain hole 107, and the drainage capacity of the exhaust gas purification device 2 is improved. Therefore, the corrosion resistance of the exhaust gas purification device 2 is improved.

Further, since the first drain hole 107 is formed at the position in the radial direction on the basis of the center line (the longitudinal axis A) in the exhaust gas moving direction in the outer lid bodies 54 and 65, it is possible to close both the end portions in the exhaust gas moving direction of the purification casing 40 by the outer lid bodies 54 and 65 having the same shape. As a result, it is possible to reduce the constructing parts number so as to contribute to the cost reduction. Further, it is possible to easily change the attaching directions around the center axis (the longitudinal axis A) of the outer lid bodies 54 and 65 in relation to each of the end portions in the exhaust gas moving direction of the purification casing 40, without changing the shapes of the outer lid bodies 54 and 65. Further, it is possible to enhance the degree of freedom of the attaching direction of the outside case (for example, the catalyst outside case 47 and the sound absorbing outside case 51) in relation to the engine 1.

Further, the second drain hole 108 is formed at the position at least in the lower portion in each of the outside cases 47 and 49 in the state in which the purification casing 40 is mounted to the engine 1, the second drain hole 108 discharging the water which is accumulated between the inside cases 46 ad 48 and the outside cases 47 and 49. As a result, in spite of the fact that the purification casing 40 is constructed as the double structures of the inside cases 46 and 48 and the outside cases 47 and 49 so as to secure the heat insulating property, it is possible to discharge the water accumulated between the inside cases 46 and 48 and the outside cases 47 and 49 due to the dew condensation or the rain water from the second drain hole 108, and the drainage capacity of the exhaust gas purification device 2 is improved. Accordingly, it is possible to contribute to the further improvement of the corrosion resistance of the exhaust gas purification device 2.

As is apparent from the description mentioned above and FIGS. 13 and 14, in the exhaust gas purification device 2 provided with a plurality of filter bodies 43 and 44 which purify the exhaust gas discharged by the engine 1, and the purification casing 40 which is constructed by a plurality of purification cases 46 to 51 having each of the filter bodies 43 and 44 built-in, and having the purification inlet pipe 41 and the purification outlet pipe 42 in the purification casing 40, the annular projection portion 111 is formed in the connection flange body 110 by protruding, in the direction of the purification inlet pipe 41, the opening edge portion of the connection flange body 110 attached to the purification inlet pipe 41 and the annular projection portion 111 of the connection flange body 110 is fixed by welding to the purification inlet pipe 41. As a result, the weld portion to the leading end outer peripheral side of the purification inlet pipe 41 is spaced from the flat portion of the connection flange body 110. Therefore, the adverse effect of the high heat due to the welding is hard to be applied to the connection flange body 110 in spite of the fact that the connection flange body 110 is firmly fixed by welding to the purification inlet pipe 41, and it is possible to maintain the flatness of the flat portion of the connection flange body 110. As a result, it is possible to suppress the risk that the stress causing the breakage of the exhaust gas purification device 2 is locally generated in the connection flange body 110.

As is apparent from the description mentioned above and FIGS. 13 and 14, the purification cases 46 to 51 are constructed by a plurality of inside cases 46, 48 and 50 which have each of the filter bodies 43 and 44 built-in, and a plurality of outside cases 47, 49 and 51 which respectively accommodate the inside cases 46, 48 and 50, and the purification inlet pipe 41 is constructed as the double tube structure. As a result, the heat insulating property is improved not only in the purification casing 40 but also in the purification inlet pipe 41. Therefore, it is possible to suppress the temperature reduction of the exhaust gas within the purification casing 40. Further, it is possible to prevent the temperature rise within the arranged space (for example, the hood of the working machine) of the engine 1, and it is possible to suppress the heat balance deterioration.

As shown in the description mentioned above and FIG. 9, the purification outlet pipe 42 passes through the purification casing 40, and the end portion in the closed side of the purification outlet pipe 40 is constructed as the double wall structure. As a result, the heat insulating property is improved not only in the purification casing 40 and the purification inlet pipe 41 but also in the purification outlet pipe 42. Therefore, it is possible to further suppress the temperature reduction of the exhaust gas within the purification casing 40. Further, it is possible to prevent the temperature rise within the arranged space (for example, the hood of the working machine) of the engine 1, and it is possible to more securely suppress the heat balance deterioration.

As is apparent from the description mentioned above and FIG. 15, in the engine device having the intake pipe 35 for supplying the fresh air to the intake manifold 6, the breather chamber 38 for separating the lubricating oil, the breather chamber 38 being arranged within the head cover 8 covering the upper surface side of the cylinder head 5, and the blow-by gas return pipe 37, the engine device being structured such that the intake pipe 35 and the breather chamber 38 are connected via the blow-by gas return pipe 37, the fresh air temperature sensor 120 is attached to the intake pipe 35, the fresh air temperature sensor 120 detecting the temperature of the fresh air introduced into the intake pipe 35. Therefore, it is possible to constantly fix the attachment position (layout) of the fresh air temperature sensor 120 in relation to the engine 1, and it is possible to constantly measure the fresh air temperature under the same condition (position) in relation to the engine 1. As a result, any correction applied to the result of detection is not required, and it is possible to maintain the precision of the engine control on the basis of the simple structure. It is possible to construct the structure of detecting the fresh air temperature at a low cost.

As is apparent from the description mentioned above and FIG. 15, the fresh air temperature sensor 120 is positioned closer to the intake air upstream side than the connection portion 123 to the blow-by gas return pipe 37 in the intake pipe 35. Therefore, it is possible to detect the fresh air temperature before mixing the blow-by gas into the fresh air. It is possible to prevent the fresh air temperature sensor 120 from being polluted by the lubricating oil in the blow-by gas.

As is apparent from the description mentioned above and FIG. 15, the sensor attachment base 124 is integrally formed in the upper surface side of the intake pipe 35, the fresh air temperature sensor 120 is detachably fastened to the sensor attachment base 124 by the bolts, and the connecting direction of the fresh air wiring connector 125 provided in the fresh air temperature sensor 120 is set so as to be along the longitudinal direction of the intake pipe 35. Therefore, it is possible to make the harness connected to the fresh air wiring connector 125 be along the intake pipe 35, and the existence of the harness does not get in the way.

The present invention is not limited to the embodiment mentioned above, but can be specified into various aspects. The structure of each of the portions in the present invention is not limited to the illustrated embodiment, but can be variously changed and modified within the range which does not deflect from the scope of the present invention.

REFERENCE SIGNS LIST

1 Engine
2 DPF (exhaust gas purification device)
5 Cylinder head
6 Intake manifold
8 Head cover
35 Intake pipe
37 Blow-by gas return pipe
38 Breather chamber
120 Fresh air temperature sensor
121 Mixed gas temperature sensor
122 EGR gas temperature sensor
123 Connection portion
124 Sensor attachment base
125 Fresh air wiring connector

The invention claimed is:

1. An engine device comprising:
an intake pipe for supplying fresh air to an intake manifold;
a breather chamber for separating lubricating oil, the breather chamber being arranged within a head cover covering an upper surface side of a cylinder head; and
a blow-by gas return pipe:
the engine device being structured such that the intake pipe and the breather chamber are connected via the blow-by gas return pipe,
wherein a fresh air temperature sensor is attached to the intake pipe, the fresh air temperature sensor detecting a temperature of the fresh air introduced into the intake pipe; and
wherein the fresh air temperature sensor is positioned closer to an intake air upstream side than a connection portion to the blow-by gas return pipe in the intake pipe.

2. The engine device according to claim 1, wherein a sensor attachment base is integrally formed in an upper surface side of the intake pipe, the fresh air temperature sensor is detachably fastened to the sensor attachment base by bolts, and a connecting direction of a fresh air wiring connector provided in the fresh air temperature sensor is set so as to be along a longitudinal direction of the intake pipe.

3. An engine device comprising:
an intake pipe for supplying fresh air to an intake manifold;
a breather chamber for separating lubricating oil the breather chamber being arranged within a head cover covering an upper surface side of a cylinder head; and
a blow-by gas return pipe;
the engine device being structured such that the intake pipe and the breather chamber are connected via the blow-by gas return pipe,
wherein a fresh air temperature sensor is attached to the intake pipe, the fresh air temperature sensor detecting a temperature of the fresh air introduced into the intake pipe, and wherein a sensor attachment base is integrally formed in an upper surface side of the intake pipe, the fresh air temperature sensor is detachably fastened to the sensor attachment base by bolts, and a connecting direction of a fresh air wiring connector provided in the fresh air temperature sensor is set so as to be along a longitudinal direction of the intake pipe.

* * * * *